(12) United States Patent
Menssen et al.

(10) Patent No.: US 11,228,821 B2
(45) Date of Patent: Jan. 18, 2022

(54) TWO-WAY DUAL-TONE METHODS AND SYSTEMS FOR SYNCHRONIZING REMOTE MODULES

(71) Applicants: Benjamin Menssen, Hannover (DE); Steven Allen Morris, Celle (DE)

(72) Inventors: Benjamin Menssen, Hannover (DE); Steven Allen Morris, Celle (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 53 days.

(21) Appl. No.: 16/751,400

(22) Filed: Jan. 24, 2020

(65) Prior Publication Data
US 2020/0245044 A1 Jul. 30, 2020

Related U.S. Application Data

(60) Provisional application No. 62/796,156, filed on Jan. 24, 2019.

(51) Int. Cl.
*H04Q 9/04* (2006.01)
*G01V 5/12* (2006.01)
(Continued)

(52) U.S. Cl.
CPC ............ *H04Q 9/04* (2013.01); *E21B 47/13* (2020.05); *E21B 49/00* (2013.01); *G01V 3/20* (2013.01);
(Continued)

(58) Field of Classification Search
CPC .......... H04Q 9/04; H04Q 2213/13405; E21B 47/13; E21B 49/00; G01V 3/20; G01V 5/12
See application file for complete search history.

(56) References Cited

U.S. PATENT DOCUMENTS 5,995,449 A 11/1999 Green et al.
7,180,825 B2 2/2007 Shah et al.
(Continued)

FOREIGN PATENT DOCUMENTS

WO 2012087734 A2 6/2012
WO 2016108885 A1 7/2016

OTHER PUBLICATIONS

International Search Report, International Application No. PCT/US2020/015004, dated May 22, 2020, Korean Intellectual Property Office; International Search Report 4 pages.
(Continued)

*Primary Examiner* — Amine Benlagsir
(74) *Attorney, Agent, or Firm* — Cantor Colburn LLP

(57) ABSTRACT

Methods and systems of correcting operation of multiple modules are described. The methods include generating a first dual-tone signal in a first module and transmitting the first dual-tone signal to a second module. A second dual-tone signal is generated in the second module and transmitted to the first module. The first module determines a first phase of the received second dual-tone signal and the second module determines a second phase of the received first dual-tone signal. Operation of one or both of the first and second modules is corrected based on the determined first phase and the determined second phase.

17 Claims, 14 Drawing Sheets

(51) Int. Cl.
    *G01V 3/20*     (2006.01)
    *E21B 49/00*     (2006.01)
    *E21B 47/13*     (2012.01)

(52) U.S. Cl.
    CPC ..... *G01V 5/12* (2013.01); *H04Q 2213/13405* (2013.01)

(56) References Cited

U.S. PATENT DOCUMENTS

| | | |
|---|---|---|
| 8,866,633 B2 | 10/2014 | Montgomery et al. |
| 9,004,195 B2 | 4/2015 | Regener et al. |
| 9,765,615 B2 | 9/2017 | Liu et al. |
| 2005/0088180 A1* | 4/2005 | Flanagan ............... G01V 13/00 324/338 |
| 2010/0244842 A1* | 9/2010 | Wang ................. G01V 3/28 324/338 |
| 2014/0192621 A1* | 7/2014 | Ram ................. E21B 47/14 367/81 |
| 2017/0315263 A1 | 11/2017 | Griffing et al. |
| 2018/0059280 A1* | 3/2018 | Hartmann ............... G01V 3/30 |

OTHER PUBLICATIONS

International Written Opinion, International Application No. PCT/US2020/015004, dated May 22, 2020, Korean Intellectual Property Office; International Written Opinion 6 pages.

\* cited by examiner

TWO-WAY DUAL-TONE METHODS AND SYSTEMS FOR SYNCHRONIZING REMOTE MODULES

CROSS REFERENCE TO RELATED APPLICATIONS

This application claims the benefit of an earlier filing date from U.S. Provisional Application Ser. No. 62/796,156, filed Jan. 24, 2019, the entire disclosure of which is incorporated herein by reference.

BACKGROUND

1. Field of the Invention

The present invention generally relates to subsurface operations and more particularly synchronization of modules of downhole tools.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to energy or a material (e.g., heat, a gas, or fluid) contained in a formation located below the earth's surface. Different types of tools and instruments may be disposed in the boreholes to perform various tasks and measurements.

Electrical well logging is well known and various devices and various techniques have been described for this purpose. Properties of the formation may be estimated by creating electromagnetic (EM) excitation in the formation with at least one transmitter, and receiving related signals at one or more receiver antennas. Estimation of these properties aids in understanding the structure of the earth formation, which enables and/or facilitates exploration and development of the formation.

Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using a separate receiver antenna.

Logging instruments may be used to estimate parameters of interest, such as formation properties used for characterizing, modeling, and conducting operations on the formation. Historically, measurements of resistivity, or its inverse, conductivity, and permittivity have been used for, among other reasons, inferring the fluid content of the earth formations and distances to bed boundaries. Also, lower conductivity (higher resistivity) measurements may be indicative of hydrocarbon-bearing earth formations. More recently, logging instruments have been included as part of a drilling system to conduct logging-while-drilling (LWD) or measurement-while-drilling (MWD).

SUMMARY

Disclosed herein are systems and methods for correcting operation of multiple modules. The methods include generating a first dual-tone signal using a first signal generator in a first module, the first dual-tone signal having a first frequency $f_1$ and a second frequency $f_2$ that is different from the first frequency $f_1$. The first dual-tone signal is transmitted from the first module to a second module. A second dual-tone signal is generated using a second signal generator in the second module, the second dual-tone signal having a third frequency $f_3$ and a fourth frequency $f_4$ that is different from the third frequency $f_3$. The second dual-tone signal is transmitted from the second module to the first module. The first module determines a first phase of the received second dual-tone signal. The second module determines a second phase of the received first dual-tone signal. The operation of at least one of the first module and the second module is corrected based on the determined first phase and the determined second phase.

The systems for correcting an operation of multiple modules include a first module, a second module, and a communication line operably connecting the first module to the second module. The first module is configured to generate a first dual-tone signal, the first dual-tone signal having a first frequency $f_1$ and a second frequency $f_2$ that is different from the first frequency $f_1$. The first module is configured to transmit the first dual-tone signal to the second module through the communication line. The second module is configured to generate a second dual-tone signal, the second dual-tone signal having a third frequency $f_3$ and a fourth frequency $f_4$ that is different from the third frequency $f_3$. The second module is configured to transmit the second dual-tone signal to the first module through the communication line. The first module is configured to receive the second dual-tone signal and to determine a first phase of the received second dual-tone signal. The second module is configured to receive the first dual-tone signal and to determine a second phase of the received first dual-tone signal. A processor is configured to correct an operation of at least one of the first module and the second module based on the determined first phase and the determined second phase.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
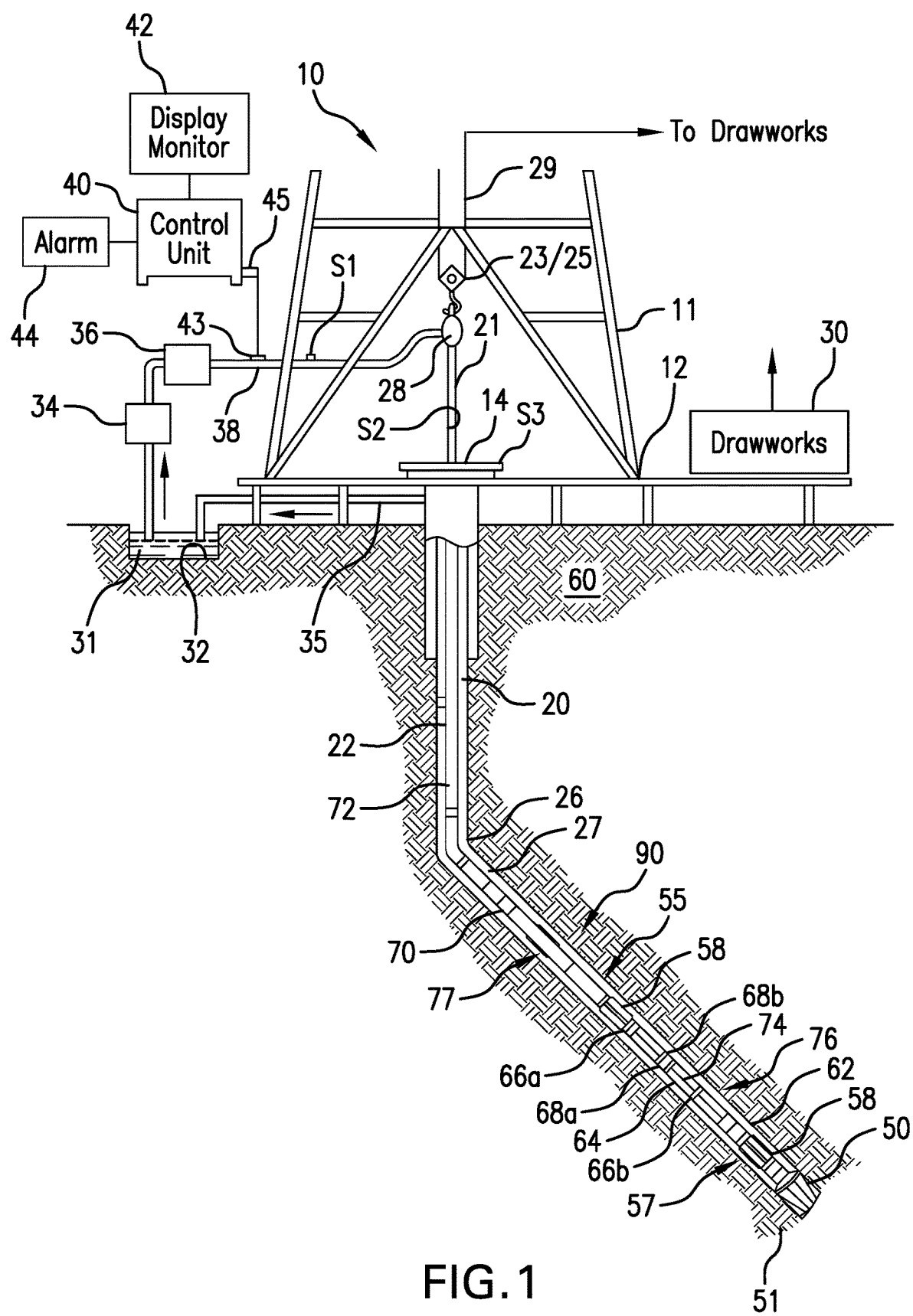
FIG. 1 is an example of a system for performing subsurface operations that can employ embodiments of the present disclosure.

FIG. 1 shows a schematic diagram of a system for performing subsurface operations (e.g., downhole, within the earth or below other surface and into a formation). As shown, the system is a drilling system 10 that includes a drill string 20 having a drilling assembly 90, also referred to as a bottomhole assembly (BHA), conveyed in a borehole or wellbore 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the drilling assembly 90, disintegrates the geological formations when it is rotated to drill the borehole 26. The drill string 20 is coupled to a drawworks 30 via a kelly joint 21, swivel 28, traveling block 25, and line 29 through a pulley 23. During the drilling operations, the drawworks 30 is operated to control the weight-on-bit (WOB), which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through an inner bore of the drill string 20 by a mud pump 34. The drilling fluid 31 passes into the drill string 20 via a desurger 36, fluid line 38 and the kelly joint 21. Fluid line 38 may also be referred to as a mud supply line. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26. The system may further include one or more downhole sensors 70 located on the drill string 20 and/or the drilling assembly 90.

In some applications the disintegrating tool 50 is rotated by rotating the drill pipe 22. However, in other applications, a drilling motor 55 (such as a mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the formation 60 for a given formation and a drilling assembly largely depends upon the weight-on-bit and the rotational speed of the disintegrating tool 50. In one aspect of the embodiment of FIG. 1, the drilling motor 55 is coupled to the disintegrating tool 50 via a drive shaft (not shown) disposed in a bearing assembly 57. If a mud motor is employed as the drilling motor 55, the mud motor rotates the disintegrating tool 50 when the drilling fluid 31 passes through the drilling motor 55 under pressure. The bearing assembly 57 supports the radial and axial forces of the disintegrating tool 50, the downthrust of the drilling motor and the reactive upward loading from the applied weight-on-bit. Stabilizers 58 coupled to the bearing assembly 57 and at other suitable locations on the drill string 20 act as centralizers, for example for the lowermost portion of the drilling motor assembly and other such suitable locations.

A surface control unit 40 receives signals from the downhole sensors 70 and devices via a sensor 43 placed in the fluid line 38 as well as from sensors S1, S2, S3, hook load sensors, sensors to determine the height of the traveling block (block height sensors), and any other sensors used in the system and processes such signals according to programmed instructions provided to the surface control unit 40. For example, a surface depth tracking system may be used that utilizes the block height measurement to determine a length of the borehole (also referred to as measured depth of the borehole) or the distance along the borehole from a reference point at the surface to a predefined location on the drill string 20, such as the drill bit 50 or any other suitable location on the drill string 20 (also referred to as measured depth of that location, e.g. measured depth of the drill bit 50). Determination of measured depth at a specific time may be accomplished by adding the measured block height to the sum of the lengths of all equipment that is already within the wellbore at the time of the block-height measurement, such as, but not limited to drill pipes 22, drilling assembly 90, and disintegrating tool 50. Depth correction algorithms may be applied to the measured depth to achieve more accurate depth information. Depth correction algorithms, for example, may account for length variations due to pipe stretch or compression due to temperature, weight-on-bit, wellbore curvature and direction. By monitoring or repeatedly measuring block height, as well as lengths of equipment that is added to the drill string 20 while drilling deeper into the formation over time, pairs of time and depth information are created that allow estimation of the depth of the borehole 26 or any location on the drill string 20 at any given time during a monitoring period. Interpolation schemes may be used when depth information is required at a time between actual measurements. Such devices and techniques for monitoring depth information by a surface depth tracking system are known in the art and therefore are not described in detail herein.

The surface control unit 40 displays desired drilling parameters and other information on a display/monitor 42 for use by an operator at the rig site to control the drilling operations. The surface control unit 40 contains a computer that may comprise memory for storing data, computer programs, models and algorithms accessible to a processor in the computer, a recorder, such as tape unit, memory unit, etc. for recording data and other peripherals. The surface control unit 40 also may include simulation models for use by the computer to process data according to programmed instructions. The control unit responds to user commands entered through a suitable device, such as a keyboard. The control unit 40 can output certain information through an output device, such as s display, a printer, an acoustic output, etc., as will be appreciated by those of skill in the art. The control unit 40 is adapted to activate alarms 44 when certain unsafe or undesirable operating conditions occur.

The drilling assembly 90 may also contain other sensors and devices, downhole components, or tools for providing a variety of measurements relating to the formation 60 surrounding the borehole 26 and for drilling the wellbore 26 along a desired path. Such devices may include a device for measuring formation properties, such as the formation resistivity or the formation gamma ray intensity around the borehole 26, near and/or in front of the disintegrating device 50 and devices for determining the inclination, azimuth and/or position of the drill string. A downhole component comprising a logging-while-drilling (LWD) device for measuring formation properties, such as a formation resistivity tool 64 or a gamma ray device 76 for measuring the formation gamma ray intensity, made according to an embodiment described herein, may be coupled to the drill string 20 including the drilling assembly 90 at any suitable location. For example, coupling can be above a lower kick-off subassembly 62 for estimating or determining the resistivity of the formation 60 around the drill string 20 including the drilling assembly 90. Another location may be near or in front of the disintegrating tool 50, or at other suitable locations.

Coupling of different downhole components to the drill string is achieved by combining two downhole components with a downhole connection. In some configurations, as will be appreciated by those of skill in the art, the downhole connection (or coupling) may be by use of a threaded pin-box connection. Downhole components can be combined to form a BHA. The BHA in turn can be combined with drill pipes or tubulars to form a drill string with the BHA at the lower end of the drill string. A pin-box connection combining two downhole components provides a mechanical connection, one or more data channels for exchanging data between the downhole components, and one or more power channels for providing power to the downhole components. The data channel may be a wire connection, an optical connection, or a wireless connection. In downhole applications, the data channel and power channel can be combined in a one-line connection. The one-line connection is configured to transfer both data and power from one downhole component to another.

A directional survey tool 74 that may comprise means to determine the direction of the drilling assembly 90 with respect to a reference direction (e.g., magnetic north, vertical up or down direction, etc.), such as a magnetometer, gravimeter/accelerometer, gyroscope, etc. may be suitably placed for determining the direction of the drilling assembly, such as the inclination, the azimuth, and/or the toolface of the drilling assembly. Any suitable direction survey tool may be utilized. For example, the directional survey tool 74 may utilize a gravimeter, a magnetometer, or a gyroscopic device to determine the drill string direction (e.g., inclination, azimuth, and/or toolface). Such devices are known in the art and therefore are not described in detail herein.

Direction of the drilling assembly may be monitored or repeatedly determined to allow for, in conjunction with depth measurements as described above, the determination of a wellbore trajectory in a three-dimensional space. In the above-described example configuration, the drilling motor 55 transfers power to the disintegrating tool 50 via a shaft (not shown), such as a hollow shaft, that also enables the drilling fluid 31 to pass from the drilling motor 55 to the disintegrating tool 50. In alternative embodiments, one or more of the parts described above may appear in a different order, or may be omitted from the equipment described above.

Still referring to FIG. 1, other LWD devices (generally denoted herein by numeral 77), such as devices for measuring rock properties or fluid properties, such as, but not limited to, porosity, permeability, density, salt saturation, viscosity, permittivity, sound speed, etc. may be placed at suitable locations in the drilling assembly 90 for providing information useful for evaluating the subsurface formations 60 or fluids along borehole 26. Such devices may include, but are not limited to, acoustic tools, nuclear tools, nuclear magnetic resonance tools, permittivity tools, and formation testing and sampling tools.

The above-noted devices may store data to a memory downhole and/or transmit data to a downhole telemetry system 72, which in turn transmits the received data uphole to the surface control unit 40. The downhole telemetry system 72 may also receive signals and data from the surface control unit 40 (downlink) and may transmit such received signals and data to the appropriate downhole devices. In one aspect, a mud pulse telemetry system may be used to communicate data between the downhole sensors 70 and devices and the surface equipment during drilling operations. A sensor 43 placed in the fluid line 38 may detect the mud pressure variations, such as mud pulses responsive to the data transmitted by the downhole telemetry system 72. Sensor 43 may generate signals (e.g., electrical signals) in response to the mud pressure variations and may transmit such signals via a conductor 45 or wirelessly to the surface control unit 40. In other aspects, any other suitable telemetry system may be used for one-way or two-way data communication between the surface and the drilling assembly 90, including but not limited to, a wireless telemetry system, such as an acoustic telemetry system, an electro-magnetic telemetry system, a wired pipe, or any combination thereof. The data communication system may utilize repeaters in the drill string or the wellbore. One or more wired pipes may be made up by joining drill pipe sections, wherein each pipe section includes a data communication link that runs along the pipe. The data connection between the pipe sections may be made by any suitable method, including but not limited to, electrical or optical line connections, including optical, induction, capacitive or resonant coupling methods. A data communication link may also be run along a side of the drill string 20, for example, if coiled tubing is employed.

The drilling system described thus far relates to those drilling systems that utilize a drill pipe to convey the drilling assembly 90 into the borehole 26, wherein the weight-on-bit is controlled from the surface, typically by controlling the operation of the drawworks. However, a large number of the current drilling systems, especially for drilling highly deviated and horizontal wellbores, utilize coiled-tubing for conveying the drilling assembly subsurface. In such application a thruster is sometimes deployed in the drill string to provide the desired force on the disintegrating tool 50. Also, when coiled-tubing is utilized, the tubing is not rotated by a rotary table but instead it is injected into the wellbore by a suitable injector while a downhole motor, such as drilling motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Liner drilling or casing drilling can be one configuration or operation used for providing a disintegrating device that becomes more and more attractive in the oil and gas industry as it has several advantages compared to conventional drilling. One example of such configuration is shown and described in commonly owned U.S. Pat. No. 9,004,195, entitled "Apparatus and Method for Drilling a Wellbore, Setting a Liner and Cementing the Wellbore During a Single Trip," which is incorporated herein by reference in its entirety. Importantly, despite a relatively low rate of penetration, the time of getting a liner to target is reduced because the liner is run in-hole while drilling the wellbore simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

One or more sensors of the systems may be configured to sense amplitudes of vibrations or oscillations over time may be disposed on the drill string or the BHA. In one or more embodiments, one or more of the sensors may be disposed near the drill bit or disintegrating device so as to sense vibrations or oscillations at a point of excitation of the drill string. The drill bit may be considered a point of excitation due to interaction of the drill bit with a formation rock as the formation rock is being drilled. Alternatively, or in addition thereto, one or more sensors may be configured to sense torque. Sensed data from the one or more sensors may be transmitted to a surface receiver or a surface computer processing system for processing. Alternatively, or in addition thereto, sensor data may be processed downhole by downhole electronics, which may also provide an interface with a telemetry system.

Although FIG. 1 is shown and described with respect to a drilling operation, those of skill in the art will appreciate that similar configurations, albeit with different downhole components, can be used for performing different subsurface operations. For example, wireline, coiled tubing, and/or other configurations can be used as is known in the art. Further, production configurations can be employed for extracting and/or injecting materials from/into earth formations. Thus, the present disclosure is not to be limited to drilling operations but can be employed for any appropriate or desired subsurface operation(s).

Aspects of the present disclosure relate to apparatus and methods for electromagnetic well logging for evaluating an earth formation. More specifically, the present disclosure relates to estimating and displaying properties of the formation relating to electromagnetic (EM) measurements. The formation may be intersected by a wellbore and the measurements may be taken in the wellbore using one or more downhole tools, downhole components, and/or modules, for example. The EM measurements may be used to estimate parameters of interest, such as formation water saturation or distance of the borehole to rock formation boundary. Aspects of the present disclosure facilitate the display and analysis of EM measurements. Further aspects may include methods for conducting a drilling operation by estimating the parameter of interest (e.g., resistivity, conductivity, permittivity) in real-time during the drilling operation and conducting the drilling operation in dependence upon the estimate.

The present disclosure is susceptible to embodiments of different forms. They are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic measurement tools are well known in the art. Inductive sensors are used in downhole tools, particularly in logging-while-drilling ('LWD') and measurement-while-drilling ('MWD') contexts. The basic topology often consists of one or more transmitters associated with one or more respective receivers.

Aspects of the present disclosure may include various components for performing an electromagnetic excitation including exciting currents, voltages, or electric (or magnetic) fields, generating electromagnetic waves, or other electrical phenomena in a formation surrounding a borehole, and for sensing electrical effects of the generated phenomena, such as, for example, one or more coils or electrodes. A component (e.g., a coil or a ring electrode) referred to herein as a transmitter may generate an oscillating signal in an adjacent geological formation, e.g., by supplying a square wave signal, sinusoid signal, or other oscillating signal to a coil. Any number of oscillating voltage signals having one or more waveforms, comprising one or more frequencies, may be used. It may also be desirable that, on occasion, a single-frequency signal, such as a sinusoidal signal, is used. One application for downhole electromagnetic measurements is formation evaluation, where the goal is to evaluate the content of a possible reservoir. Another application is associated with "geosteering" and/or reservoir navigation, where EM measurements are used to measure the geometry of downhole geological structures of the purpose of making drilling steering decisions.

On the transmitter side, an electromagnetic field is generated in the formation by using a transmitter coil. The electrical properties of the formation are contained in the receiver response. Resistivity instruments transmit signals into a formation and receive measurement signals from the formation in cooperation with one or more antennas. Changes of the measurement signal, such as changes in signal amplitude and/or signal phases, with the measurement signal being related to and indicative of the electromagnetic fields being measured, contain information regarding properties of the surrounding formation (e.g., resistivity, conductivity, permittivity, distance to bed, etc.). Transmitter frequencies of a downhole resistivity tool or instrument are typically between 400 Hz and 200 kHz.

Those skilled in the art will understand that there are various types of measurement signals within the scope of this disclosure. As a non-limiting example, a measurement signal may be an analog voltage created in an electrode, a receiver coil, or any other type of antenna in response to an electromagnetic field in the formation. As another non-limiting example, the measurement signal may be a digital information such as a data word, representing a number that is related to the electromagnetic field in the formation. Other analog or digital information that is related to the electromagnetic field in the formation in a known manner, may also serve as measurement signals.

For instance, an electronic module comprising a sensor could be used to measure the electromagnetic field in the formation to generate analog or digital measurement signals that are related to the electromagnetic field in the formation. Measurement signals are subject to analog and/or digital processing to derive one or more parameters of interest. For instance, the analog voltage sensed by a receiver coil, electrode, or other type of antenna may be subject to one or more of amplifications, filtering, compensations, adjustments, corrections, analog-digital conversion, digital-analog conversion, and computations to calculate one or more of a resistivity, a conductivity, a permittivity, or a distance to a formation bed. In a similar manner, digital information related to the electromagnetic field in the formation may be subject to one or more of amplifications, filtering, compensations, adjustments, corrections, analog-digital conversion, digital-analog conversion and computations to calculate one or more of a resistivity, a conductivity, a permittivity, or a distance to a formation bed.

In resistivity measurements, formation caused-phase differences and formation caused-attenuations (amplitude ratio) between the current or voltage in a transmitter antenna and the voltage signal at a receiving antenna is measured (collected data of the receiver), or the formation caused-phase difference and formation caused-attenuation between signals of two receiving antennas is measured. Thus, for conventional measurements, knowledge of signal phase differences or time delays caused by transmission properties of communication lines (e.g., transmit time) or other electronics components of a transmitter-receiver system is necessary to obtain a measurement of the formation caused-differences (e.g., phase shifts) between the transmitter and receiver or between two receivers. The phase difference or corresponding time delay caused by the transmission properties or electronics components are also referred to as transmission caused-phase difference $\Delta\theta_{TX}$ and transmission caused-time delay $\Delta t$, respectively.

That is, a start time of the signal must be shared between the transmitter and receiver, i.e., the receiver acquisition start time can be adjusted to coincide with the time when the transmitter initiated a transmission. As such collected data may be synchronized with generated data. For applications where the transmitter and receiver are on the same sub, a physical "trigger" line from the transmitter circuit to each receiver circuit can be used to provide this trigger synchronization.

Figure 2:
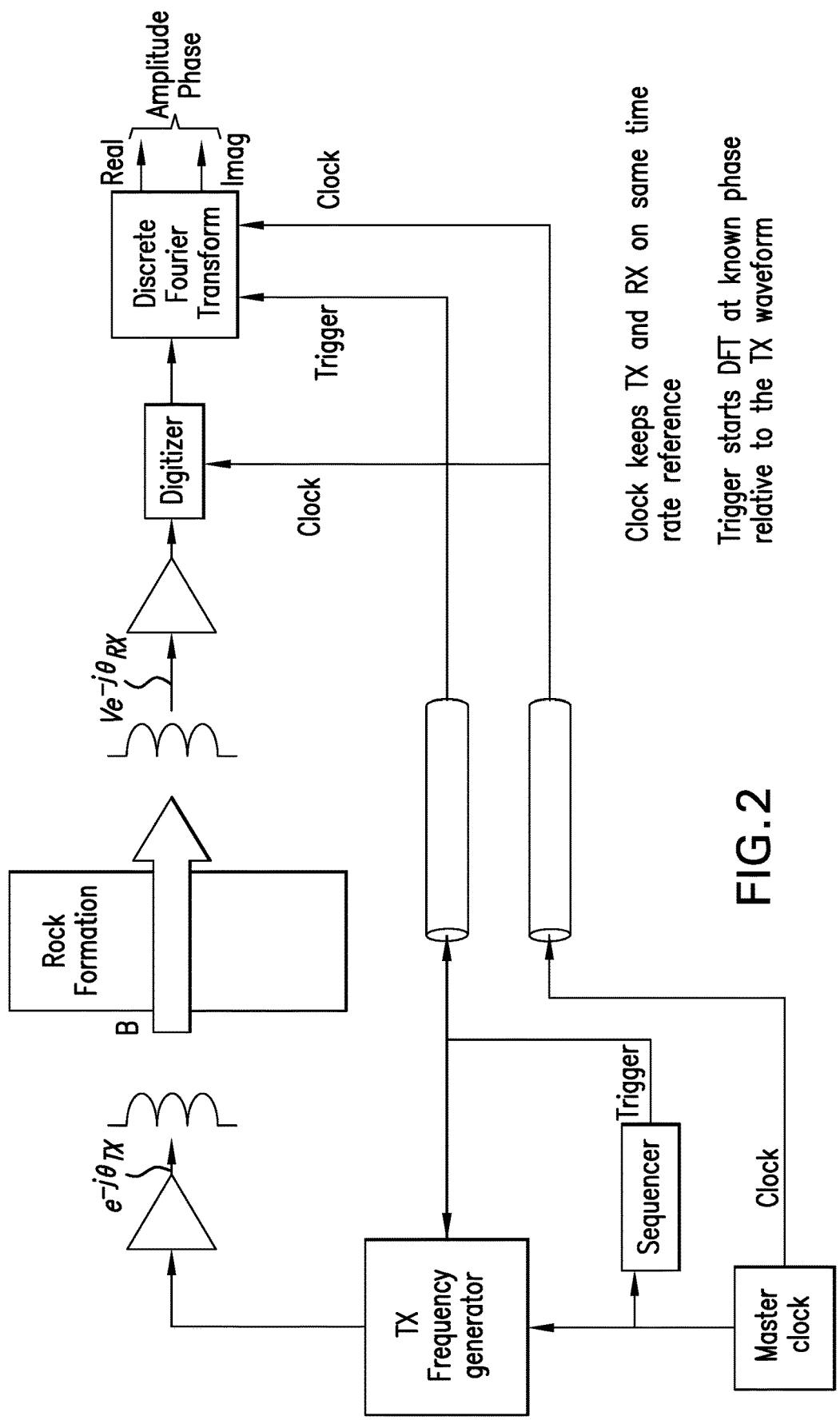
FIG. 2 is a schematic diagram of a system for resistivity measurements on a single module, showing synchronization functions between transmitter and receiver.

Referring to FIG. 2, in a typical single module system having a transmitter-receiver single-sub arrangement, propagation resistivity measurement may be performed as follows. In such systems, all of the electronics and antennas are mounted in a single logging-while-drilling subassembly (sub). Individual measurements are usually single frequency continuous wave (CW) measurements. A transmitter antenna produces a primary magnetic field $B_{TX}$, with reference phase $\theta_{TX}$ at a transmitter frequency $f_{TX}$, also referred to as a formation frequency $f_m$, that induces eddy currents in a rock formation downhole that produce secondary magnetic fields $B_f$. A receiver antenna, in response to the primary and secondary magnetic fields in the formation, produces a voltage of magnitude V and phase $\theta_{RX}$. The zero phase reference point for the receiver measurement is the phase of the primary magnetic field $\theta_{TX}$, so the necessary phase measurement is the formation caused-phase difference between the primary and secondary magnetic fields (i.e., $\theta_{RX}-\theta_{TX}$).

In such systems, a master clock keeps all the transmitter frequency generator, digitizer, and sequencer locked at the same clock rate or clock frequency. At the receiver, the antenna signal is amplified and digitized and processed with a Fourier transform (such as a Discrete Fourier Transformation (DFT), a Continuous Fourier Transformation (CFT), or a Fast Fourier Transformation (FFT)). A DFT will measure the magnitude and phase of the signal relative to the time the DFT is triggered. A sequencer acts as a state machine to insure that when a DFT acquisition cycle occurs, the trigger will be coincident with some known phase on the transmitter (TX) frequency generator. Because of delays in the system electronics and cables, the receiver measured phase will have a fixed additive offset error relative to the correct receiver phase.

Without any rock formation, it is known that $\theta_{RX}=\theta_{TX}$, so an "air hang" test is used to determine fixed transmitter-receiver phase offsets. In an air hang test, a resistivity measurement is performed with the resistivity tool surrounded by air instead of a formation. For actual measurements downhole, measured air hang phase $\Delta\theta_{airhang}$ offsets are subtracted from the raw phase measurements to obtain corrected phase. Corrected phase measurements, $\theta_{RX}-\theta_{TX}$, are processed to yield formation resistivity and other formation properties.

In the single-sub system shown in FIG. 2, synchronization between the transmitter and receiver is accomplished using two hardware signals. First, a clock signal from the system master clock is used at the receiver to insure that the receiver digitizer operates at a fixed and known time rate relative to the transmitter master clock. This function of synchronization is referred to as "clock frequency matching" or "clock frequency locking." Secondly, a trigger signal is used to start the receiver DFT at a known phase relative to the transmitter phase. This function of synchronization is referred to as "trigger synchronization" or "phase synchronization." The clock frequency may be a sine wave signal or a square wave signal or any other kind of waveform (e.g., triangle, sawtooth, etc.).

The above hardware trigger synchronization is not possible when transmitters/receivers are located in separate modules or submodules. In such cases, transmitter and receiver antennas may be located in submodules adjacent to each other or with one or more modules or submodules located between them. These submodule systems are typically not interconnected by multiple isolated conductors, only by a single line communication bus down the length of the borehole assembly (e.g., along a BHA). Accordingly, embodiments provided herein are directed to enabling trigger synchronization by using that communication channel, e.g., the BHA communication bus, when antennas are mounted on separate submodules. For modular submodule resistivity tools, e.g., those used in extra deep resistivity measurements, synchronization may be problematic. By spanning a plurality of subs, the transmitter and receiver are connected over a communication channel (e.g., a communications bus) having its own inherent transmission properties including time delays that depend upon the data communication traffic on the communication channel and depend upon the distance between the transmitter and the receiver and the number of other downhole components that are located between the transmitter and the receiver or the BHA design, respectively. Thus, information about the start time of the transmitted signal sent to the receiver via the communication bus may experience an uncertain time delay Δt, also referred to as a transmission delay.

In deep reading resistivity tools, the transmitter and the receiver are located in different downhole tools, downhole components, subs, or (sub)modules in the BHA. As such, the transmitter and the receiver are separated by a certain distance along a longitudinal axis of the BHA, which is provided to enable a large depth of investigation with such tools and configurations. The distance between the different downhole components may be larger than 1 meter, larger than 3 meters, larger than 5 meters, larger than 10 meters, or larger than 20 meters. In such a set-up at least one downhole component connection or tool connection is located between the transmitter and the receiver along the string of components (e.g., along the BHA). As noted above, a tool connection can be a threaded pin-box connection in the BHA in a drill string. Such a tool connection in the BHA not only connect two adjacent/connected submodules mechanically, but also provides a data communication means between the two adjacent/connected submodules. A data communication means may be an electrical connection, an optical connection, or a wireless connection. Such data connections may comprise one or more communication lines, such as one or more wires, one or more optical fibers, or one or more wireless connections.

In most cases, an electrical (i.e., wired) connection between submodules in the BHA is employed and may be limited to only a single wire or line (one-line connection) which enables data and power transfer from one submodule to another submodule. The one-line connection provides the communication bus in the BHA. Therefore, a tool connection (coupling) will electrically connect the one-line connection of one submodule with the one-line connection of another submodule. In such wired configurations, the tool bodies of the submodule in the BHA may act as a ground wire. The electrical connection of the one-line connection across the pin-box connector can be accomplished using a ring electrode or, alternatively, by a centralized connector which is located within the inner bore of the BHA. The larger the distance between the transmitter and the receiver along the length of the BHA, the deeper is the depth of investigation of the resistivity tool. Therefore, one or more other submodules or downhole components may be located between the transmitter and the receiver to achieve a desired spacing. The downhole components that may be located between the transmitter and the receiver may be, for example, another LWD or MWD tool, a Mud Pulse Telemetry tool (e.g., a Pulser), a stabilizer, a reamer, or a spacer sub.

When additional downhole components are arranged between the transmitter submodule and the receiver submodule additional pin-box connections and additional tool connections will need to be passed by the communication line between the transmitter submodule and the receiver submodule. The communication line that runs along the BHA in the drill string is the communication bus of the BHA. Accordingly, communication between each of the submodules in the BHA can be achieved. The communication bus may be a standardized bus system, such as a Power Line bus, that is configured to provide power to all components in the BHA and provide a communication protocol for internal communication and data exchange. It will be appreciated that alternative bus systems in the BHA are possible without departing from the scope of the present disclosure. For example, other bus systems may include, without limitation, CAN, Profibus, or Ethernet bus systems may be employed.

In such systems, trigger synchronization in a deep reading resistivity tool needs to be done using the BHA single line communication bus (i.e., one-line connections). That is, there is only one communication line connecting the transmitter and the receiver submodules in a resistivity tool to transmit. There is no separate synchronization signal channel possible as described in FIG. 2. Advantageously, the disclosed methods of the present disclosure provide a trigger synchronization method using only one communication line connecting two submodules suffering a transmission caused-phase difference or corresponding time delay related to the communication line and the spatial separation of two electronic modules.

Accordingly, embodiments of the present disclosure are directed to providing a trigger synchronization of remote modules with a high level of precision (e.g., better than 1 nanosecond (ns), better than 10 ns, better than 100 ns, or better than 1 microsecond (μs)). In accordance with some embodiments, modules (or submodules) to be trigger synchronized are connected by a communication line (e.g., hard wired, optically connected, wireless connection, etc.) and make use of frequency domain multiplexed channels (or alternatively time-division multiplexed channels). In an example, a first module transmits a dual-tone consisting of a first frequency $f_1$ and a second frequency $f_2$ while a second module responds with another dual-tone consisting of a third frequency $f_3$ and a fourth frequency $f_4$. In this example, the first frequency $f_1$ is different from the second frequency $f_2$ and the third frequency $f_3$ is different from the fourth frequency $f_4$. It will be appreciated that, in some embodiments, the first frequency $f_1$ and the third frequency $f_3$ may be equal and/or the second frequency $f_2$ and the fourth frequency $f_4$ may be equal (or all may be different). Each module performs a phase measurement of the received dual-tone and/or measures a time difference corresponding with a phase of the dual-tone. Via an additional communication protocol, the measured data (phase or time difference) may be exchanged via the communication line, so that a transmission caused-phase difference or a time delay can be calculated in the first or second module. Alternatively, the measured data may be communicated to a location outside the first and second modules, such as a third module in the BHA in the borehole or at a surface location outside the borehole (e.g., a surface processing system). As such, the transmission caused-phase difference or time delay can be calculated at a location outside the first and second modules. The transmission caused-phase difference or time delay may be applied to the measured data at the receiver, such as the receiver signal or collected data. Alternatively, the transmission caused-phase difference or time delay may be applied to the transmitter signal.

Embodiments of the present disclosure are directed to correcting phase measurements from multiple different antennas (either on the same module or on different modules) used for measuring resistivity downhole. In some embodiments, each antenna or group of antennas is located in a distinct module and connected by a common (single) communication line. A two-way process is used in which a master module sends timing signals to all slave modules, and each slave module sends a distinct timing signal back to the master module. The received timing signals are used to enable trigger synchronization of a processor or a processing system (e.g., a DFT) or phase correction of data collected (signals) at the two modules (more than two modules/antennas can be employed in some embodiments). The methods and processes described herein can also be implemented as a chain of modules in which each of the modules performs a trigger synchronization with at least one other module using dual-tone signals. A processor determines the transmission caused-phase difference or time delay between two or more modules out of the chain of modules.

As used herein, synchronization is defined as locking clock frequencies and synchronization of a trigger point is referred to as "trigger synchronization." Through the trigger synchronization, data obtained at two different locations may be aligned and reconciled, even if various time errors are injected into the system (e.g., time delays Δt). The trigger synchronization is achieved using two-way timing signals that are transmitted between the two separate modules/submodules. Analysis of the two-way timing signals provides a time delay (unit: seconds [s]) and/or a transmission caused-phase difference (unit: radian [rad] or degree [°]). The time delay or transmission caused-phase difference can be used to correct a phase measurement for a time delay Δt caused by the communication channel or other electronics components in the transmitter-receiver system or, in general, the resistivity tool to provide a formation caused-phase difference in the resistivity measurement.

Figure 3:
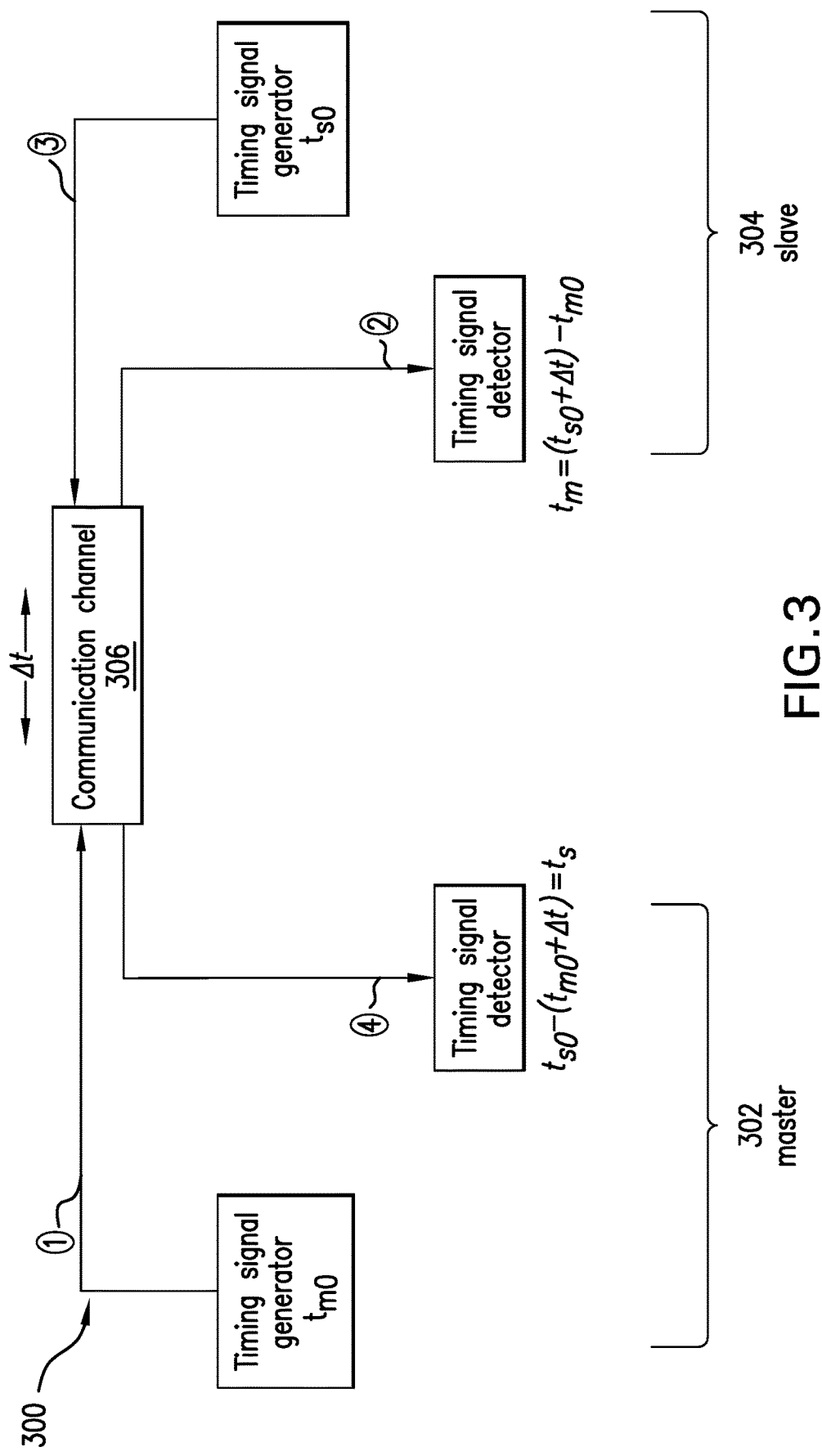
FIG. 3 is a schematic diagram of a system having a first module and a second module in accordance with an embodiment of the present disclosure.

FIG. 3 illustrates the basic principle of trigger synchronization using a two-way method over a communication channel 306 within a system 300. Across the communication channel 306 there is an unknown time delay, Δt, that is the same value in the forward direction as in the reverse direction. The time delay Δt is short-term stable over several measurement cycles of the tool, but may experience long term drift beyond that limitation (e.g., drift because of temperature change, degradation, etc.). On one side of channel 306 is a first module 302 (e.g., "master" sync unit) that has a time reference $t_{m0}$, while on the opposite side of channel 306 is a second module (e.g., "slave" sync unit) that has its own time reference $t_{s0}$, that is randomly displaced in time from the master time reference $t_{m0}$. Communication channel 306 is preferably implemented as one or more frequency domain channels in a BHA single- or multi-wire communications bus. However, channel 306 could be implemented using other means, such as acoustic communications through a drilling mud or other fluid, fiber optics channels, RF communication through the drilling mud, etc. as will be appreciated by those of skill in the art.

The master unit 302 injects a timing signal onto the communication line 306 that is coincident with the master time reference $t_{m0}$. The slave unit 304 measures the time of the occurrence of the delayed master timing signal relative to the slave time reference $t_{s0}$. Similar to the master unit 302, the slave unit 304 injects a timing signal onto the communication line 306 that is coincident with its time reference $t_{s0}$. Similar to the slave unit 304, the master unit 302 measures the occurrence of the delayed slave timing signal relative to the master time reference $t_{m0}$. The timing signals are preferably implemented using the zero differential phase point of dual-tone signals, as explained herein. However, timing signals could be implemented by other means, such as pseudo-random sequences, tone bursts, or simple digital voltage transitions.

Figure 4:
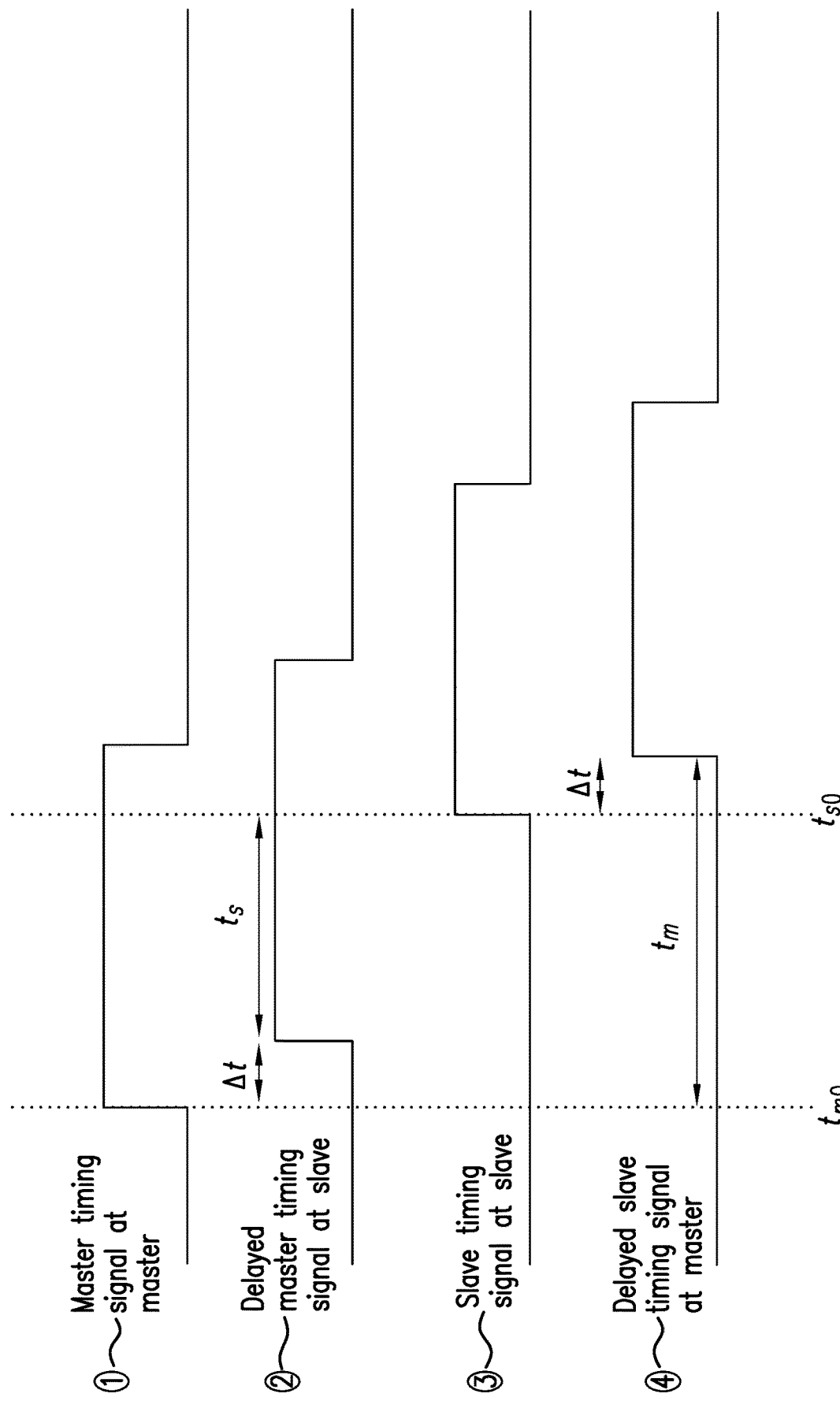
FIG. 4 is a plot illustrating, in the time domain, the two-way measurement of a transmission delay in accordance with an embodiment of the present disclosure.

FIG. 4 is a timing diagram illustrative of aspects of the present disclosure. Time runs from left to right on the diagram and rising edges are used to denote associated timing signals and delayed timing signals. Referring to FIG. 3 and FIG. 4 jointly, track numbers (i.e., 1, 2, 3, 4 indicated in circles) on the diagram correspond to locations on the diagram of FIG. 3 (i.e., 1, 2, 3, 4 indicated in circles). Track 1 shows the master timing signal generated by the master timing signal generator at the master unit 302. Track 2 shows the measurement of the delayed master timing signal detected by the slave timing signal detector at the slave unit 304. This measurement is denoted time difference $t_s$ and is equal to:

$$t_s = t_{s0} - (t_{m0} + \Delta t) \tag{1a}$$

Track 3 shows the slave timing signal generated by the slave timing signal generator at the slave unit 304. Track 4 shows the measurement of the delayed slave timing signal detected by the master timing signal detector at the master unit 302. This measurement is denoted time difference $t_m$ and is equal to:

$$t_m = (t_{s0} + \Delta t) - t_{m0} \tag{1b}$$

Solving equations (1a) and (1b) for time delay Δt yields:

$$\Delta t = \tfrac{1}{2}(t_m - t_s) \tag{1c}$$

Assuming that the trigger point of the resistivity measurement (measurement of secondary magnetic fields) is referenced to $t_{m0}$, then the Δt measurement of equation (1c) can be used in equation (1a) to calculate a time offset to reference phase measurements made at the receiver back to the transmitter phase:

$$t_{s0} - t_{m0} = t_s \mp \Delta t \tag{1d}$$

Module 304 does not know the start time of the acquisition or time reference $t_{m0}$. Therefore, a single measurement at one end of the line is not sufficient to determine the time delay Δt. However, in accordance with embodiments of the present disclosure, a two-way transmission and time delay measurement using dual-tones is provided in order to compensate for the unknown time reference $t_{m0}$.

Figure 5:
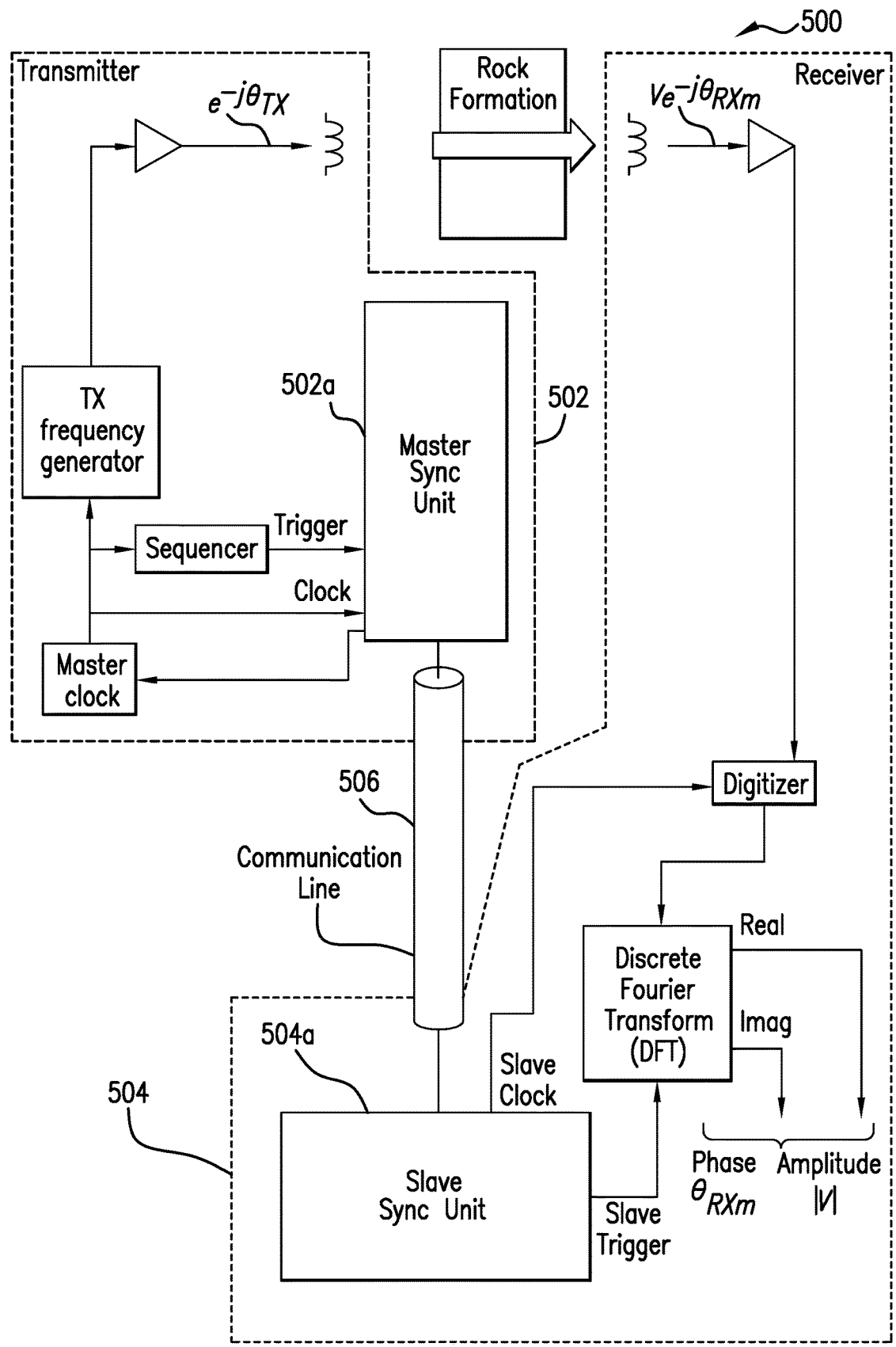
FIG. 5 is a schematic diagram of a system in accordance with an embodiment of the present disclosure.

Turning now to FIG. 5, a schematic diagram of a system 500 in accordance with an embodiment of the present disclosure is shown. In the system 500, a first module 502 (e.g., transmitter) is arranged in communication with a second module 504 (e.g., receiver) through a communication line 506. Although shown schematically with only two modules, those of skill in the art will appreciate that a plurality of modules may be connected, with different modules having different functions. For example, several subs with different functions (e.g., modules) may be connected end to end to form a bottomhole assembly (BHA).

In the transmitter, a master sync unit 502a provides a master clock frequency and a trigger signal to the communication line. Those signals are received by a slave sync unit 504a. The slave sync unit 504a has a frequency matching function, such as a phase locked loop (PLL), to produce a slave clock frequency that exactly matches the master clock frequency. In practice, the clock phase offset between the master clock and the slave clock will be fixed but indeterminate, but this does not affect the performance of the trigger synchronization system. The trigger signal is used to disambiguate the time base of the second module 504 to the time base of the first module 502.

In the system 500, and on the BHA, the receiver antenna and receiver electronics are located in a different sub (e.g., in the second module 504) from the transmitter antenna and transmitter electronics (e.g., in the first module 502). Further, one or more additional subs (modules) may be arranged between the modules having the receiver(s) and the transmitter. With additional modules installed between the modules to be trigger synchronized, difficulties arise associated with interconnecting the submodules. For example, a dedicated channel would be required to pass through each inter-located module, which is typically not possible due to the nature of each specific module (e.g., used for other purposes, and those do not have the trigger synchronization communication lines already installed therein). Further, additional wires are not technically feasible or at least desirable (e.g., difficulty in installing multiple lines for multiple purposes).

However, trigger synchronization is necessary, but the delay on the communication line cannot be predetermined and is considered stable only over a few measurement cycles of the tool. A real-time trigger synchronization system is needed to provide trigger synchronization between the transmitter and the receiver. Real-time, in this disclosure, refers to a time while performing a resistivity measurement. Real-time may also refer to a time while drilling the borehole and performing the resistivity measurement in the borehole.

A single wire communication bus (i.e., the communication line 506) runs down the length of the BHA. Although a single wire is shown and described, in some embodiments, the communication line 506 may be representative of a multi-wire communication bus. Every sub or module of the BHA can access the communication line 506. Embodiments of the present disclosure use the communications line 506 to link the transmitter to the receiver to synchronize the clocks and trigger functions of the transmitter and receiver. The trigger synchronization process of the present disclosure may provide, at least, two functions. First, the process may synchronize trigger operations (e.g., receiver DFT trigger synchronized to the transmitter DFT trigger). Second, the process may provide a transmission caused-phase difference $\Delta\theta_{TX}$ or corresponding time delay $\Delta t$ correction to adjust receiver raw measured phase $\theta_{RXm}$ to be referenced to the transmitter phase.

The trigger synchronization system of the present disclosure includes a first module 502 or unit (e.g., master unit) and a second module 504 or unit (e.g., slave unit). Further, in some embodiments, multiple second (slave) units can be used for additional transmitter and/or receiver subs. In operation, the system 500 including the first module 502 (master) can provide clock frequency reference for all second modules 504 (slaves). Each slave (second module 504) will lock its clock frequency to the clock frequency of the master (first module 502). In practice, the clock phase offset between the master clocks and the slave clocks will be fixed but indeterminate, but this does not affect the performance of the trigger synchronization systems described herein. The phase corrections are provided through a two-way dual-tone system described herein.

Figure 6:
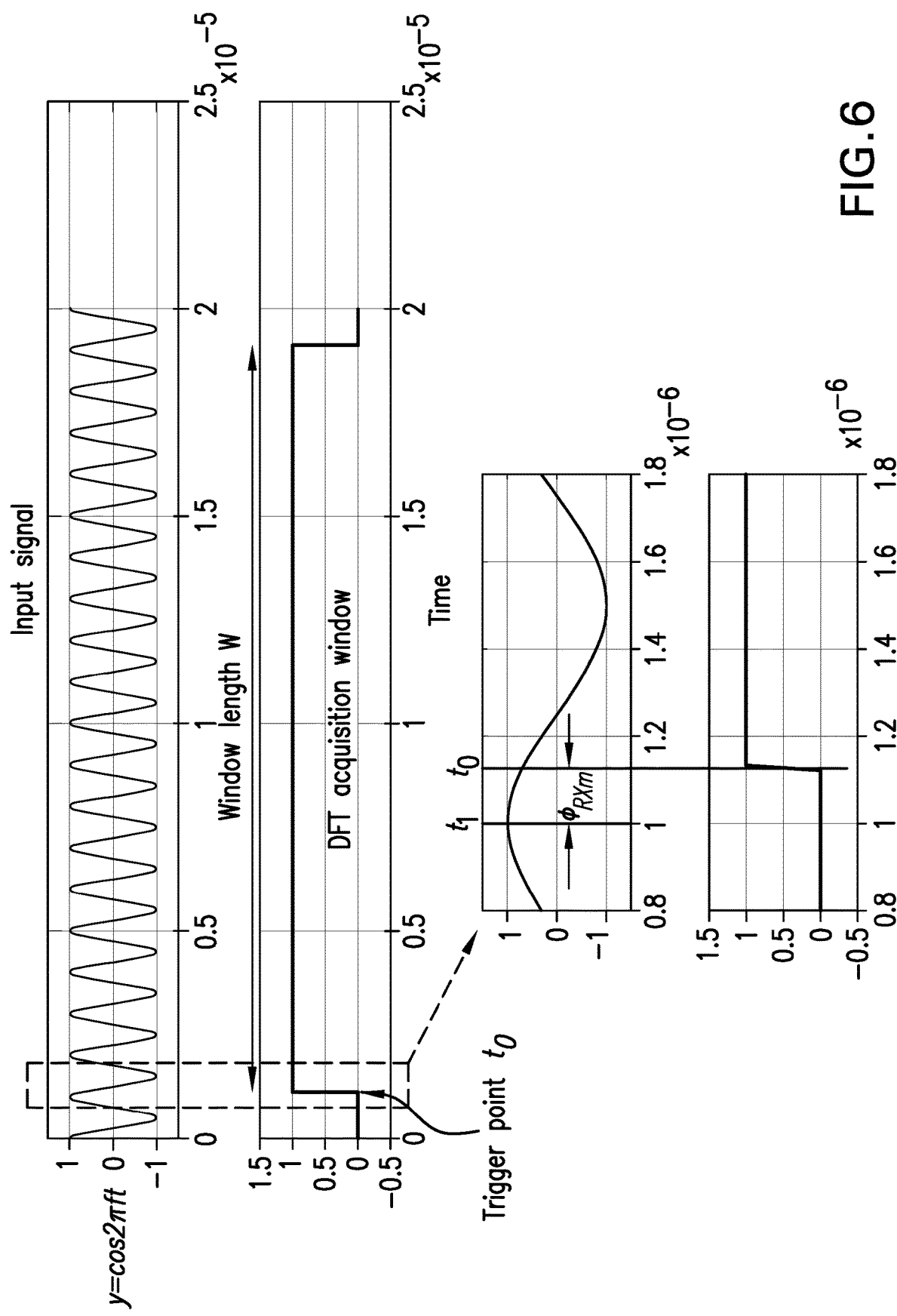
FIG. 6 includes schematic plots illustrating a Discrete Fourier Transform (DFT) process for determining a phase difference in accordance with an embodiment of the present disclosure.

FIG. 6 includes schematic plots illustrating a Discrete Fourier Transform (DFT) process. For a single frequency Discrete Fourier Transform, (DFT), the data is acquired over a window length W. Window length W should be an integral multiple of cycles of frequency being measured, or should have an appropriate window function to suppress windowing artifacts as is standard practice in DFT design. The phase measured by the DFT is referenced to the start of the acquisition window, which is referred to herein as a trigger point $t_0$. Assuming the waveform is of the form y=cos(2πft), then the DFT will measure the phase $\theta_{RXm}=2\pi f(t_0-t_1)$, where $t_1$ is the most recent time before $t_0$ where cos(2πft)=1, i.e., where ft=i, i being any integer. Equation (3) for the DFT calculation is as follows:

$$Y(f) = \frac{2}{N}\sum_{i=1}^{N}[y(t_i - t_0)(\cos 2\pi f(t_i - t_0) + j\sin 2\pi f(t_i - t_0))] \quad (2)$$

It will be appreciated that the window length in the first module and the window length in the second module do not necessarily need to be the same. However, it is noted that the processing is the easiest when the window length in the first module and the second module are equal. That being said, utilizing more complex processing could handle different window lengths in the first and second modules.

Figure 7:
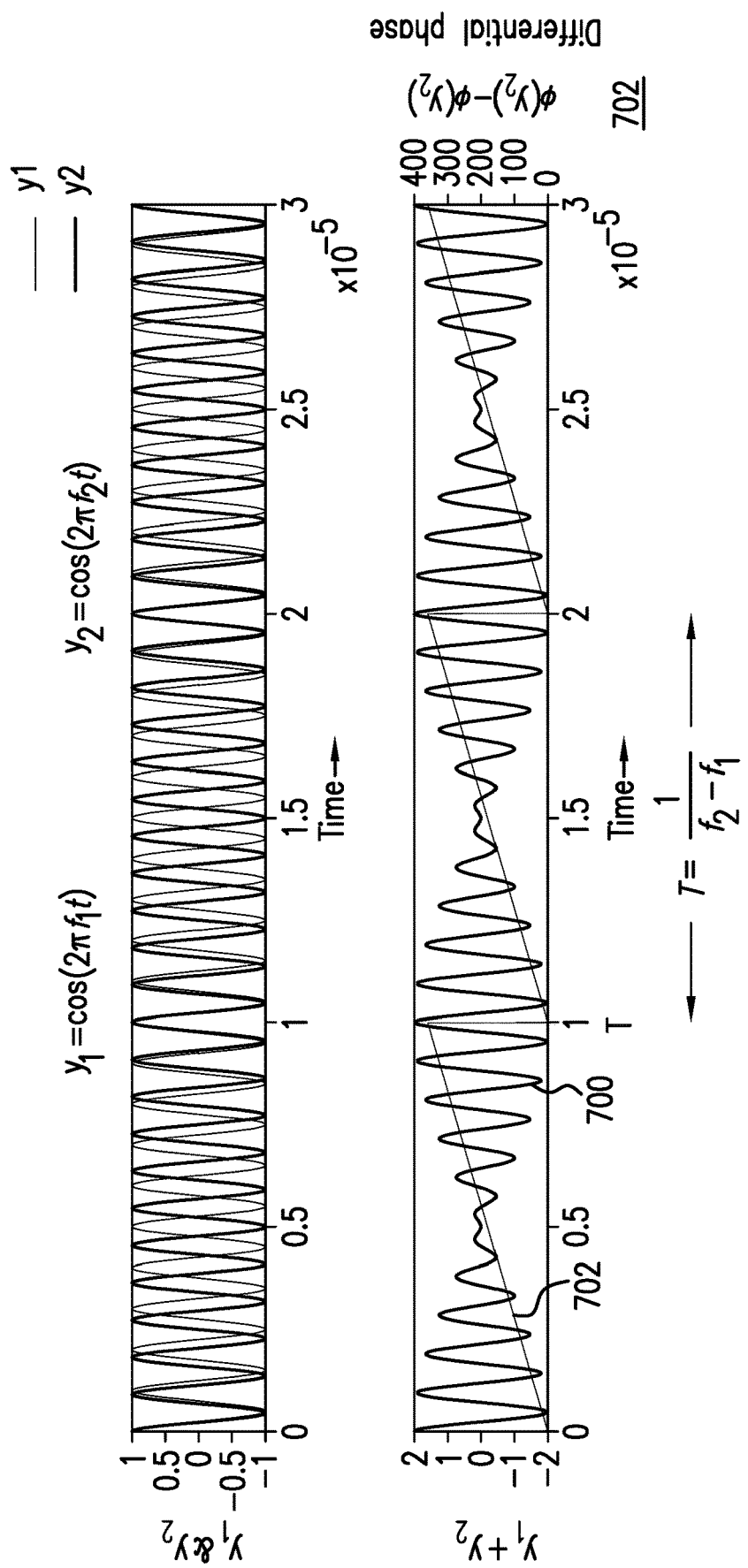
FIG. 7 illustrates a dual-tone system operation in accordance with an embodiment of the present disclosure.

FIG. 7 illustrates a basic dual-tone system operation. In FIG. 7, the upper plot shows two signals $y_1$, $y_2$, of unity amplitude and frequency $f_1$ and $f_2$. In the upper plot, $y_1$=cos(2π$f_1$t) and $y_2$=cos(2π$f_2$t). As shown in the lower plot, when the two signals $y_1$, $y_2$, are mixed (such as added), the resulting waveform 700 has an 'envelope' that repeats every $$T = \frac{1}{f_2 - f_1} \text{ seconds.}$$

The curve $\phi_2-\phi_1$ 702 shown in FIG. 7 illustrates that the instantaneous phase difference $2\pi f_2 t - 2\pi f_1 t$ will start at zero at cos 2π$f_1$t=cos 2π$f_2$t=1, and increase linearly to 2π radians (360 degrees) at time T later. The phase difference of the two tones, signals $y_1$, $y_2$, goes through zero at times when cos 2π$f_1$t=cos 2π$f_2$t=1, i.e., when $f_1$t=$f_2$t=i, with i being any integer. In some non-limiting embodiments, for example, the window length W should be an integer multiple of T, so that each dual-tone having the same frequency difference $\Delta f$ will fit into that window length W. In alternative embodiments, the dual-tone may be formed by alternative signal generating methods, such as using other mixing methods (frequency mixer) including, for example, multiplication.

Figure 8:
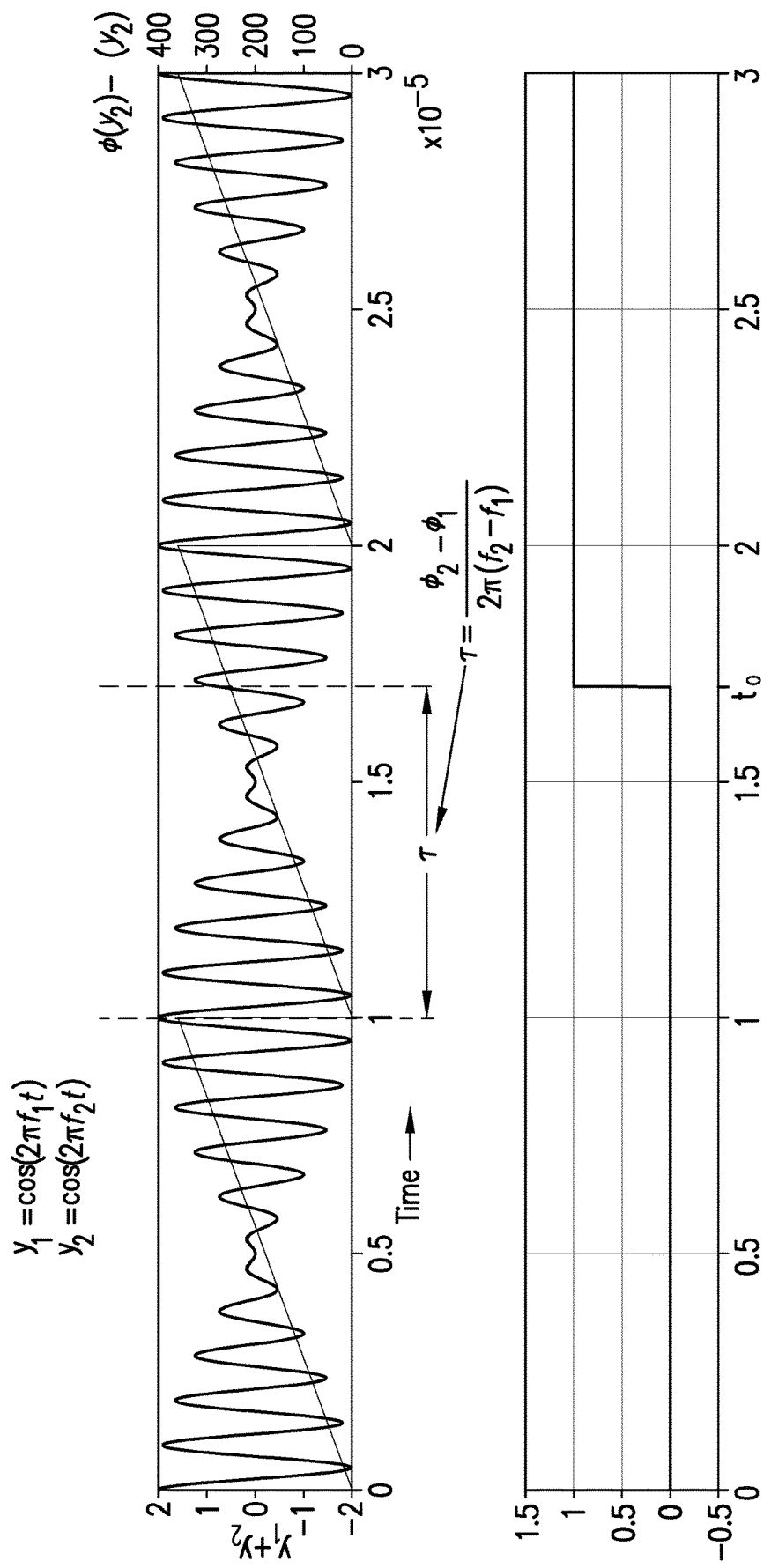
FIG. 8 illustrates a dual-tone system operation in accordance with an embodiment of the present disclosure.

Turning to FIG. 8, using multiple DFTs, one for each frequency $f_1$ and $f_2$, triggered together, the measured phase difference $\phi_2-\phi_1$ can be used to calculate the time τ from the trigger point $t_0$ to the previous zero phase difference point on the envelope. This time will range from 0<τ<T. Specifically, the time τ is calculated as:

$$\tau = \frac{\phi_2 - \phi_1}{2\pi(f_2 - f_1)} \quad (3)$$

Figure 9:
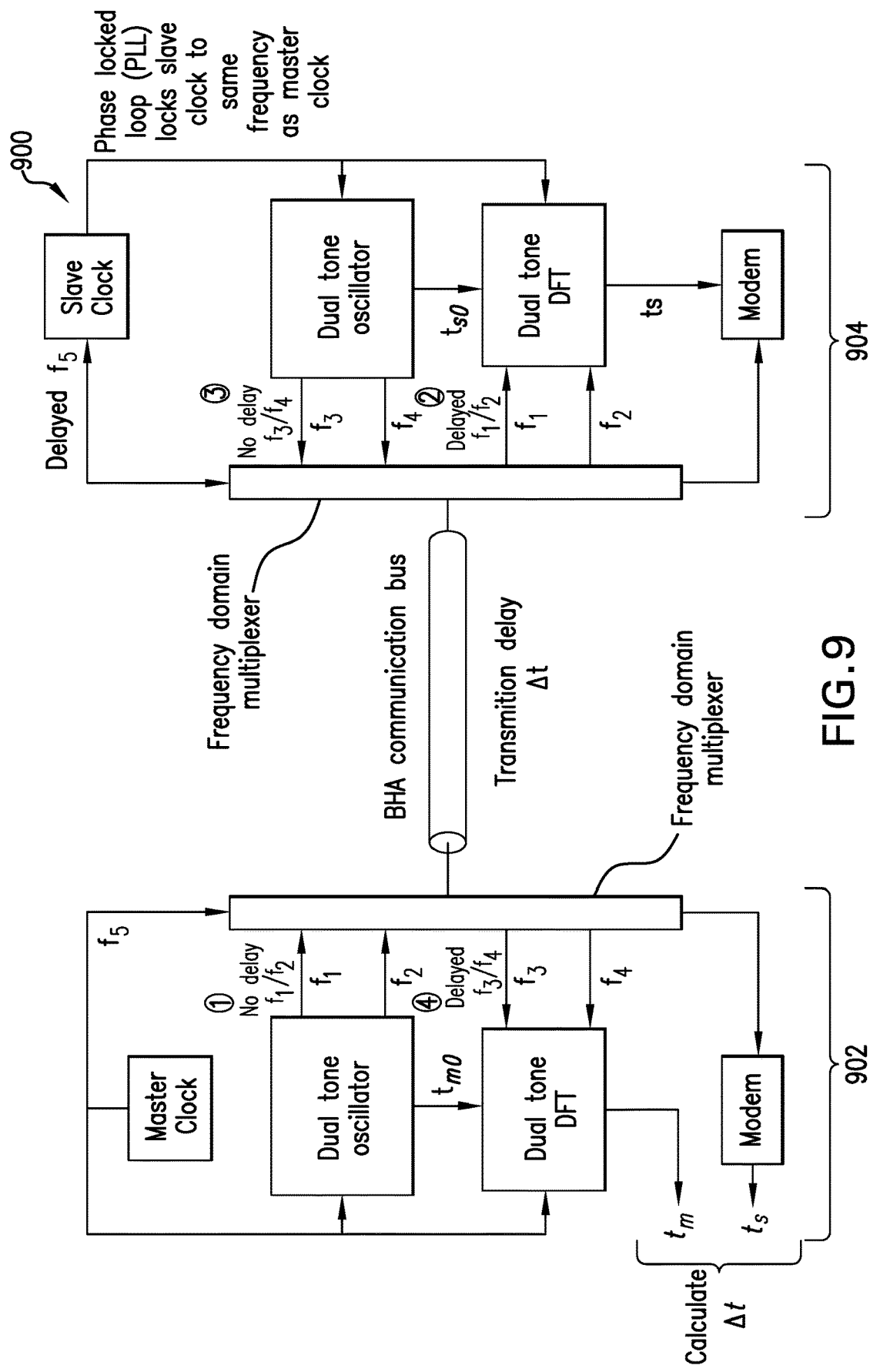
FIG. 9 is a schematic diagram of a system for determining a transmission delay in accordance with an embodiment of the present disclosure.

Turning now to FIG. 9, a schematic diagram of a system 900 for determining a transmission caused-time delay $\Delta t$ in accordance with an embodiment of the present disclosure is shown. The system 900 includes a first module 902 (e.g., a master module or transmitter module) and a second module 904 (e.g., a slave module or receiver module). The modules 902, 904 are connected via a BHA communication bus 906, e.g., similar to the system shown and described with respect to FIG. 3. Frequency domain multiplexing is used to provide four communication channels from the first module 902 to the second module 904. Alternatively, a time-division multiplexing channel may be used as well. Transmission of signal $f_5$ from the first module 902 to the second module 904 is provided for master to slave clock frequency matching. Transmission of a dual-tone signal having frequencies $f_1$ and $f_2$ from the first module 902 to the second module 904 is performed. Further, transmission of a dual-tone signal having frequencies $f_3$ and $f_4$ from the second module 904 to the first module 902 is performed. A modem channel is used to transmit digital data between the first module 902 to the second module 904. The frequency $f_1$ and the frequency $f_2$ are different. The frequency $f_3$ and the frequency $f_4$ are different. The difference between frequency $f_1$ and frequency $f_2$ is equal to the difference between frequency $f_3$ and frequency $f_4$. In a system using a frequency multiplexing channel, frequencies $f_1$, $f_2$, $f_3$, and $f_4$ are all different. In a system using a time-division multiplexed channel frequency $f_1$ may be equal to frequency $f_3$ and frequency $f_2$ may be equal to frequency $f_4$. That is, in such embodiments, only two frequencies are used to form the two dual-tone signals.

The frequencies $f_1$ to $f_4$ may be selected to suit the transmission frequencies of the frequency multiplexing channel. At the same time a frequency difference $\Delta f_1$ between frequencies $f_1$ and $f_2$ and a frequency difference $\Delta f_2$ between frequencies $f_3$ and $f_4$ should be close to the operating frequency of the first and second modules (e.g., transmitter frequency $f_{TX}$ of a resistivity transmitter). In ideal case, the frequency differences $\Delta f_1$ and $\Delta f_2$ are equal to the operating frequency of the first and second modules (see, e.g., phase wrapping explained in this disclosure). The frequency difference $\Delta f_1$ and $\Delta f_2$ may be between 400 Hz and 200 kHz, or more specifically, for example, between 400 Hz and 1 kHz, 400 Hz and 10 kHz, 400 Hz and 50 kHz, 400 Hz and 100 kHz, or 400 Hz and 200 kHz. The frequencies $f_1$ to $f_4$ may be, for example between 100 Hz and 10 MHz or, more specifically, between 100 Hz and 100 kHz, 100 Hz and 1 MHz, 100 Hz and 2 MHz, 100 Hz and 4 MHz, or 100 Hz and 10 MHz.

On the right side of FIG. 9, a phased-lock loop (PLL) or other means is used to exactly match the clock frequency of the second module 904 to the clock frequency $f_5$ of the first module 902. On the left side of FIG. 9, the clock of the first module 902 drives a dual-tone oscillator of the first module 902. On the right side, the frequency matched clock of the second module 904 drives a dual-tone oscillator of the second module 904. On the left side of FIG. 9, the first module dual-tone oscillator, driven by the first module clock, free runs to continuously produce a dual-tone $f_1/f_2$. The dual-tone DFT in the first module 902 is triggered at time $t_{m0}$ when the dual-tone $f_1/f_2$ goes through a zero differential phase point. On the right side of FIG. 9, a second module dual-tone oscillator, driven by the clock of the second module 904, free runs continuously to produce a dual-tone $f_3/f_4$. The dual-tone DFT in the second module 904 is triggered at time $t_{s0}$ when the dual-tone $f_3/f_4$ goes through a zero differential phase point.

The dual-tone DFT in the first module 902 receives a delayed dual-tone $f_3/f_4$ from the second module 904 and calculates a time difference $t_m$ between $t_{m0}$ and the preceding zero differential phase point of the delayed dual-tone $f_3/f_4$. The dual-tone DFT of the second module 904 receives a delayed dual-tone $f_1/f_2$ from the first module 902 and calculates a time difference $t_s$ between $t_{s0}$ and a preceding zero differential phase point. After measurement of the time difference $t_s$, the second module 904 transmits the value of $t_s$ through a modem system to the first module 902. At the first module 902, measured time differences $t_m$ and $t_s$ are used to calculate a transmission caused-time delay $\Delta t$ or a corresponding transmission caused-phase difference. The time delay $\Delta t$ is used to adjust a phase measurement of a received signal to be referenced to the transmitter phase in accordance with equation (1d). In operation, for example, the dual-tone, two-way system implements the two-way synchronization described in FIGS. 3-4.

The zero-differential phase points corresponding to $t_{m0}$ and $t_{s0}$ repeat every T seconds. In practice, to achieve desired accuracy of the measurement of the time delay $\Delta t$, the DFT acquisition window may extend over multiple periods T. In this case, a means must be provided to signal to the slave which zero-differential phase point corresponds to $t_{m0}$. This can be done several ways, such as, but not limited to, keying the slave on the initial turn-on of the master dual-tone signal, coordination using the modem channel from master to slave, using an amplitude modulation technique (described herein), etc.

Figure 10:
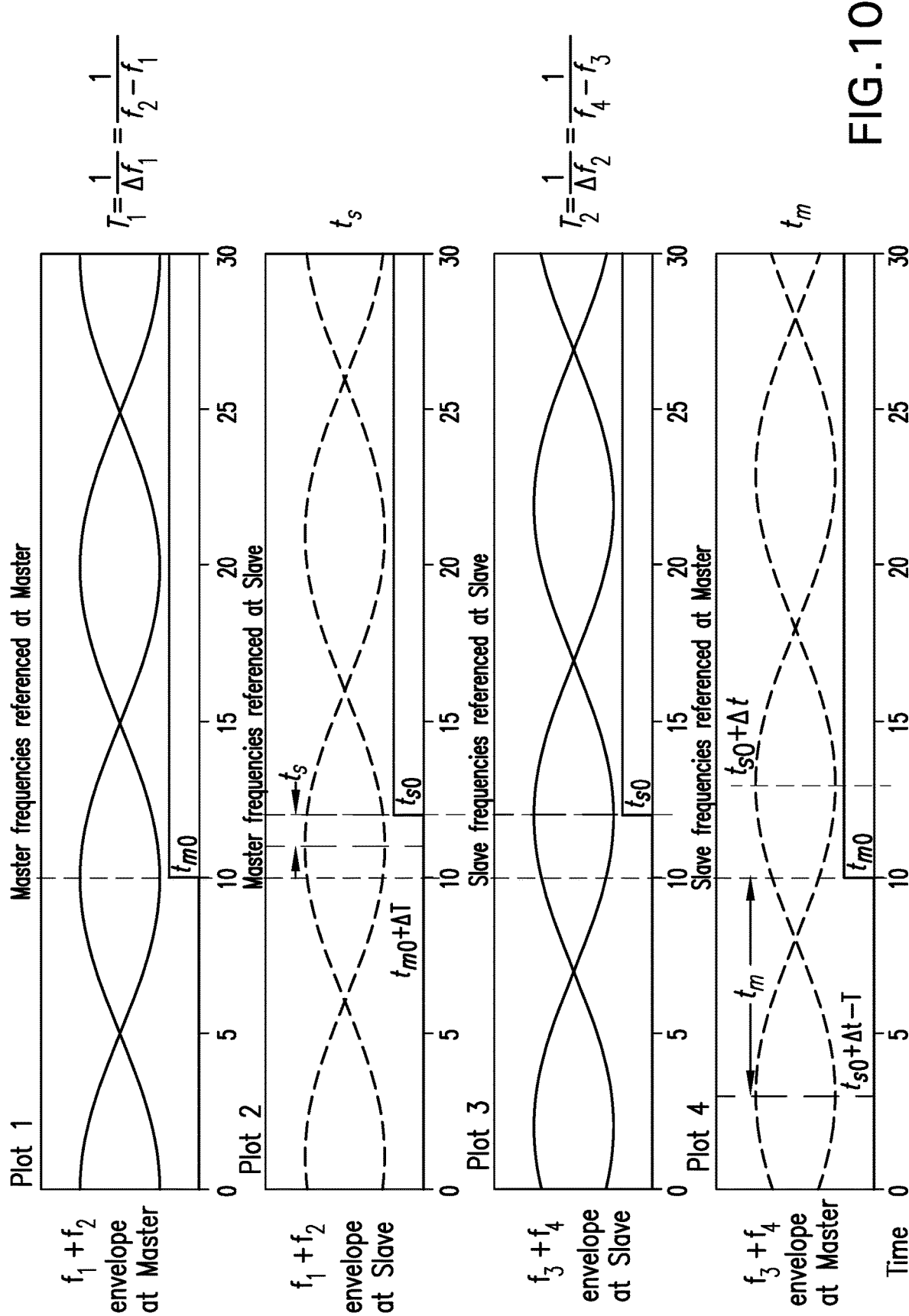
FIG. 10 includes schematic plots illustrative of two-way, dual-tone waveforms with no phase wrapping, in accordance with an embodiment of the present disclosure.

Turning now to FIG. 10, and with continued reference to FIG. 9, schematic plots illustrative of two-way, dual-tone waveforms with no phase wrapping, in accordance with an embodiment of the present disclosure are shown. All plots of FIG. 10 are shown on aligned time scales on the x-axis. Pairs of curves in each plot represent the envelope of their respective dual-tone signals.

Plot 1 of FIG. 10 corresponds to element (1) in FIG. 9, e.g., dual-tone $f_1/f_2$ from the first module 902 and corresponding $t_{m0}$. Plot 2 corresponds to element (2) in FIG. 9 and shows the delayed envelope of the first dual-tone $f_1/f_2$ and a position relative to $t_{s0}$. The occurrence of $t_{s0}$ corresponds to the point in time when the dual-tone $f_3/f_4$ goes through a zero differential phase point and is random relative to the delayed first dual-tone $f_1/f_2$, that is, the position in the plot is given as an example only.

At the second module 904, the time difference $t_s$ from $t_{s0}$ to the first previous zero phase difference point on the waveform of the first dual-tone $f_1/f_2$ is measured using the DFT of the second module 904.

Plot 3 of FIG. 10 corresponds to element (3) in FIG. 9, e.g., dual-tone $f_3/f_4$ from the second module 904 and corresponding $t_{s0}$. It is noted that time $t_{s0}$ is identical in Plot 2 and Plot 3 because the DFT in the second module 904 is triggered at time $t_{s0}$. Plot 4 corresponds to element (4) in FIG. 9, e.g., showing the envelope of the delayed dual-tone $f_3/f_4$ at the first module 902, and a position relative to $t_{m0}$. It is noted that time $t_{m0}$ is identical in Plot 1 and Plot 4 because the DFT in the first module is triggered at time $t_{m0}$.

At the first module 902, the time difference $t_m$ is measured from $t_{m0}$ to the first previous zero phase difference point on the waveform of the delayed dual-tone $f_3/f_4$ is measured using the DFT of the first module 902. The time difference $t_s$ and the time difference $t_m$ can be expressed more generically by a phase $\theta_s$ of the first dual-tone signal and a phase $\theta_m$ of the second dual-tone signal. The terms "phase difference" and "time difference" are used synonymously in this disclosure. Based on the phase $\theta_s$ and the phase $\theta_m$ the correction of the operation (e.g., correction of the receiver phase) can be performed in an analog manner, as with using the time difference $t_s$ and the time difference $t_m$.

Using the measured time differences $t_s$, $t_m$ allows calculating the transmission time delay $\Delta t$ using equation (1c), giving the transmission time delay $\Delta t=\frac{1}{2}\mathrm{mod}[(T-t_m-t_s), T]$, in terms of the measured values $t_m$ and $t_s$. The operator $\mathrm{mod}(x,y)$ is the modulo operator on x, with base y. This modulo operator handles phase wrapping of the computations which can occur as illustrated below (e.g., FIG. 11). Finally, the value of the transmission time delay $\Delta t$ is used to calculate the phase correction to be applied to the receiver measured phase: $\theta_{RX}=\theta_{RXm}-\Delta\theta_{TX}$, where $\Delta\theta_{TX}=2\pi f_m \Delta t$, and $\theta_{RXm}$ is the receiver phase measured relative to the receiver time reference $t_{s0}$. A formation caused-phase difference $\theta_{For}$ can be calculated by using the corrected receiver phase: $\theta_{For}=\theta_{TX}-\theta_{RXm}-\Delta\theta_{TX}$. The correction of the receiver phase is also referred to as correcting an operation. It is to be appreciated that the earlier described clock synchronization may be performed by transmitting a dedicated clock frequency or clock signal. In some embodiments, the frequency to synchronize the transmitter clock and the receiver clock may be one of the frequencies $f_1$, $f_2$, $f_3$, or $f_4$. In accordance with various embodiments of the present disclosure, without limitation, the trigger synchronization may be performed a single time or instance (or, e.g., on-demand), at specific or predefined intervals, or continuously.

Figure 11:
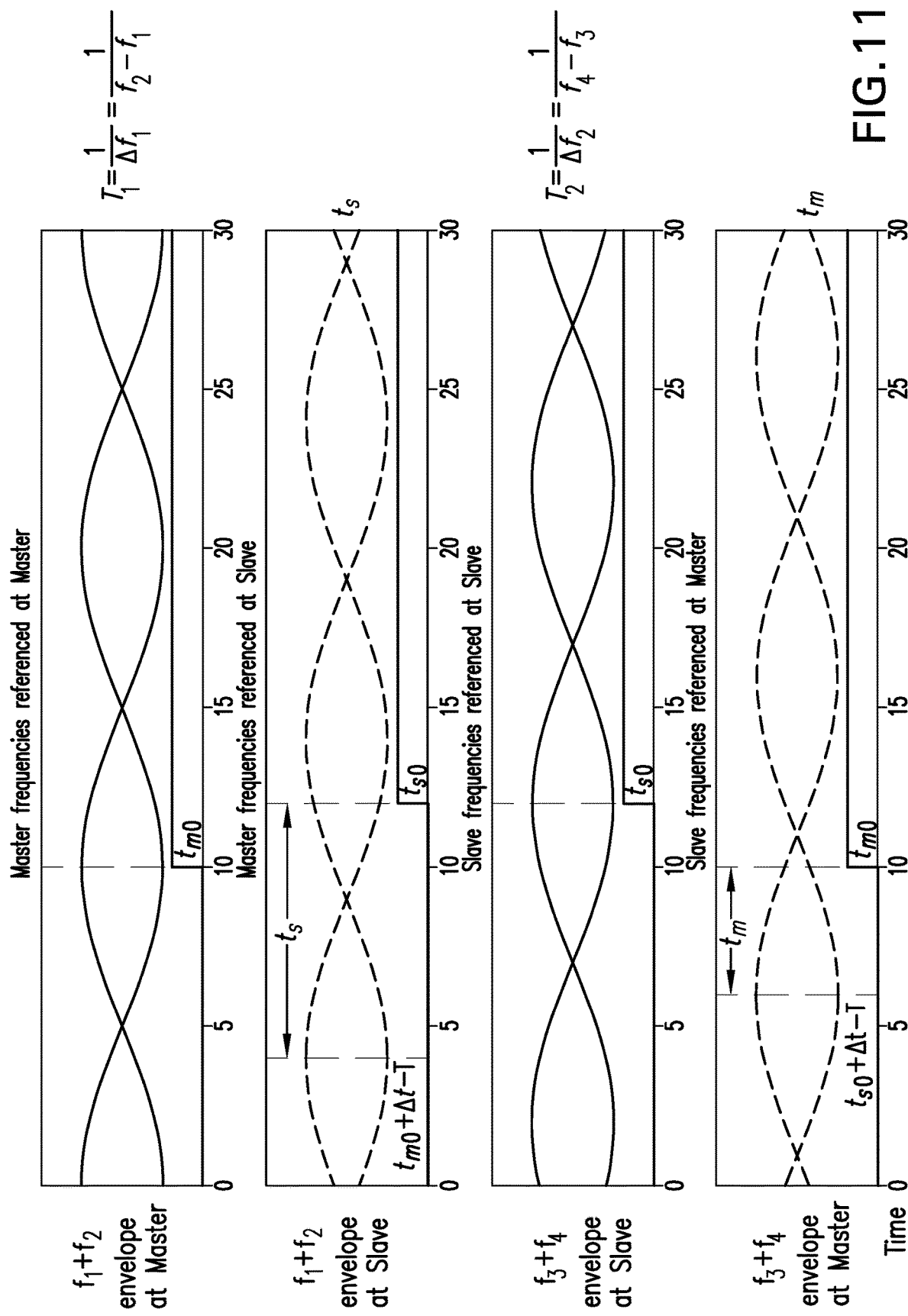
FIG. 11 includes schematic plots illustrative of two-way, dual-tone waveforms with phase wrapping, in accordance with an embodiment of the present disclosure.

Turning now to FIG. 11, schematic plots illustrative of two-way, dual-tone waveforms with phase wrapping and similar to the plots shown in FIG. 10, in accordance with an embodiment of the present disclosure are shown. All plots of FIG. 11 are shown on aligned time scales on the x-axis.

FIG. 11 illustrates the conditions: $t_{s0} < t_{m0} + \Delta t$ and $t_{m0} < t_{s0} + \Delta t$. Further, $t_s = t_{s0} - (t_{m0} + \Delta t - T)$, $t_m = t_{m0} - (t_{s0} + \Delta t - T)$, and $\Delta t = \frac{1}{2} \mod[(2T - t_m - t_s), T] = \frac{1}{2} \mod[(T - t_m - t_s), T]$. The equations for both $t_m$ and $t_s$ contain T terms and the calculation of $\Delta t$ wraps, as shown by the 2T term in the $\Delta t$ equation. By including the modulo function in the equation $\Delta t = \frac{1}{2} \mod[(T - t_m - t_s), T]$ any instances of wrapping, which will be a random occurrence, will still calculate to the correct $\Delta t$.

Figure 12:
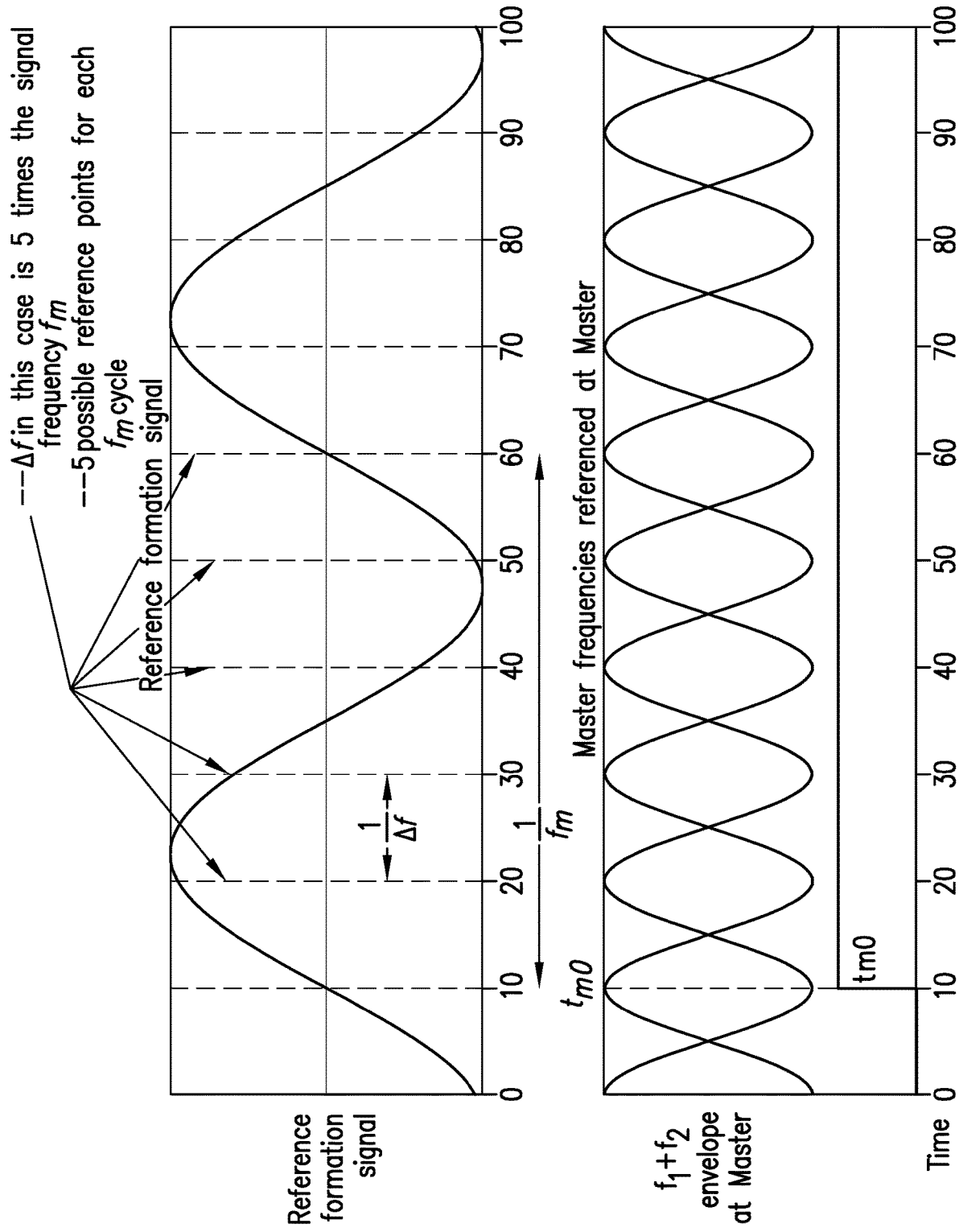
FIG. 12 includes illustrative plots of indeterminate trigger points in a two-way dual-tone system in certain special cases.

FIG. 12 is illustrative of possible trigger ambiguity in a dual-module system. At a first module, the zero phase of the transmitted frequency is aligned with a reference time $t_{m0}$ of the first module. If $\Delta f$ (i.e., the difference between frequencies forming a dual-tone) is greater than a formation frequency $f_m$, then $t_{m0}$ can occur more than once over a cycle of $f_m$. Accordingly, a free running DFT in a second module may be referenced to different $t_{m0}$ than the first module, which can result in error in correcting a received phase (measured receiver phase).

As an example, shown in FIG. 12, $\Delta f$ (frequency of dual-tone signal envelope frequency) is five times the formation signal frequency $f_m$, and thus there are five possible reference points for each cycle of the formation signal frequency $f_m$. At the first module, the zero phase of the transmitted frequency is aligned with the time reference $t_{m0}$ of the first module. In this case, because $\Delta f$ is greater than the formation frequency $f_m$ (i.e., five times greater), $t_{m0}$ can occur, e.g., 5 different times over a cycle of the formation frequency $f_m$. As such, a free running DFT at the second module may be referenced to five different possible $t_{m0}$ from the first module, resulting in error in correcting received phase.

One solution is to make $$\Delta f = \frac{f_m}{n}$$

where n is an integer. However, it may be desirable to select $\Delta f$ to be large for both noise rejection (signal-to-noise ratio (SNR)), time resolution $$\left( \Delta(\Delta t) \approx \frac{1}{\Delta f}; \Delta f = f_1 - f_2 \right),$$

and for efficient implementation of the DFT. As such, in some embodiments, a separate triggering process may be implemented to align the time references of the first module (e.g., master) and the second module (e.g., slave). This may be referred to as disambiguating the time references.

Figure 13:
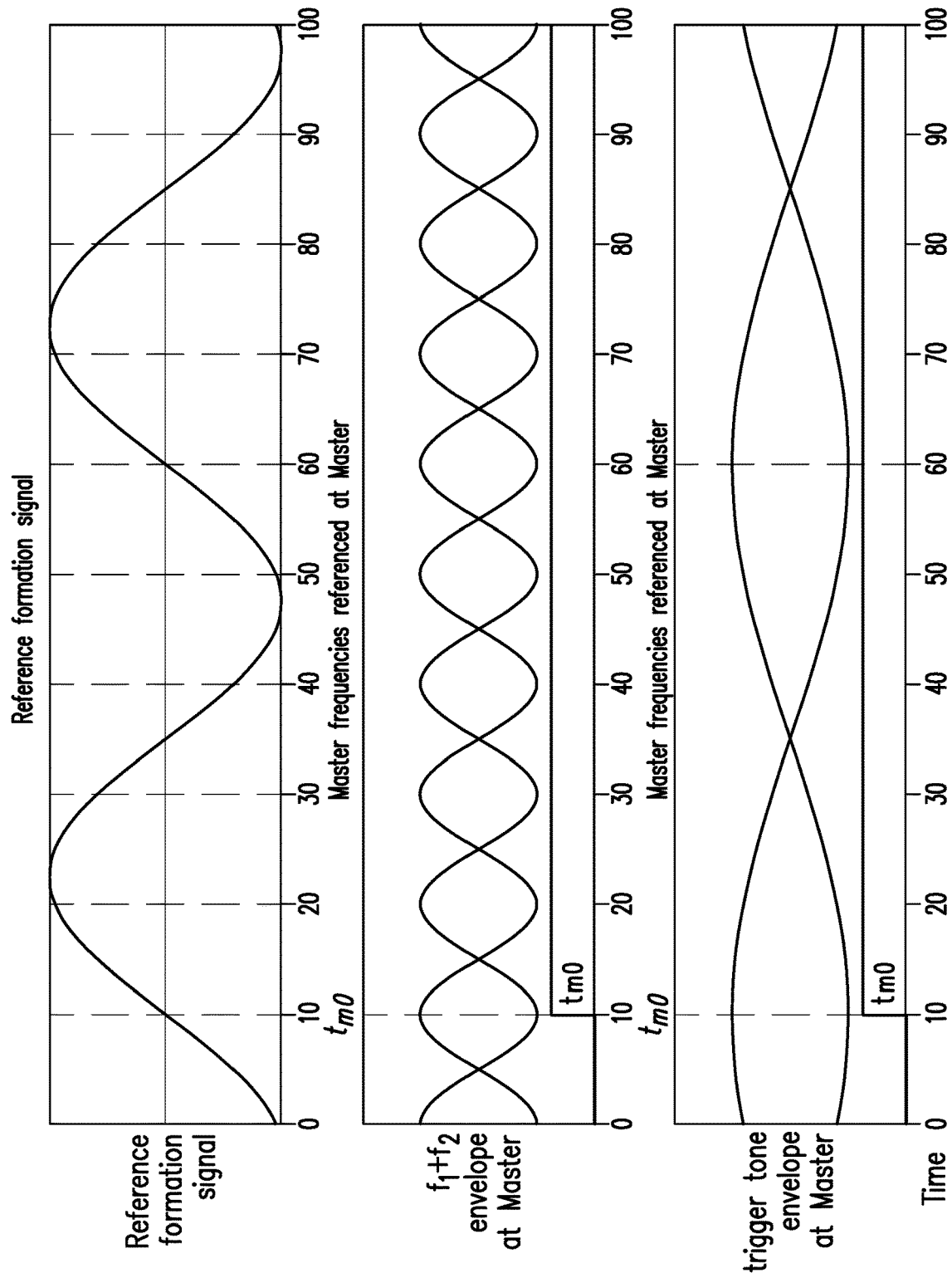
FIG. 13 is illustrative of a solution to trigger ambiguity in accordance with an embodiment of the present disclosure.

Turning now to FIG. 13, an example solution to address trigger ambiguity is provided. In this case, a third dual-tone is added at the transmitter, referred to herein as a "trigger tone," or "trigger dual-tone signal" and is shown in the lowest plot for FIG. 13. The trigger tone uses an additional frequency $f_t$. The additional frequency $f_t$ has a very small frequency difference from either frequency $f_1$ or $f_2$ such that $$\Delta f_t = \frac{f_m}{n}$$

where n is an integer. Using the additional frequency $f_t$ combined (mixed) with the frequencies $f_1$ or $f_2$ provides a further dual-tone tone (trigger tone or trigger dual-tone). The trigger tone may be employed to disambiguate the $f_1/f_2$ envelope to use at the receiver. The accuracy requirements of DFT measurement for the trigger tone difference $\Delta f_t$ are not as severe as the other $f_1/f_2$ and $f_3/f_4$ dual-tones.

Figure 14:
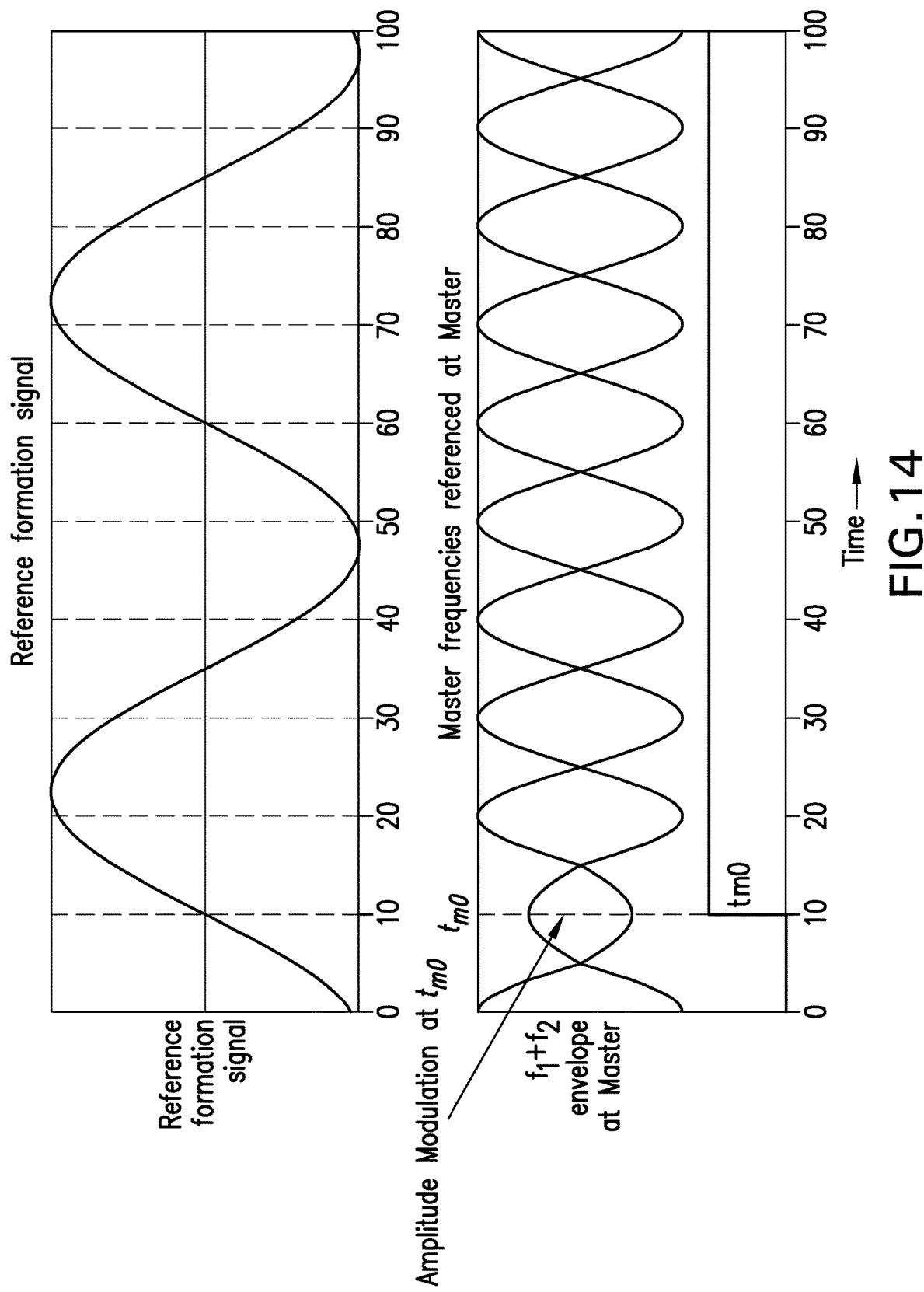
FIG. 14 is illustrative of one possible solution to indeterminate trigger points in certain special cases in accordance with an embodiment of the present disclosure.

Turning now to FIG. 14, another example solution to address trigger ambiguity is provided. In this embodiment, amplitude modulation is employed to differentiate trigger time at time reference $t_{m0}$ envelope. Thus, at the receiver, detection of modulation (e.g., amplitude modulation or frequency modulation) may be performed to disambiguate the correct $t_{m0}$ envelope at the receiver.

Although two example solutions for trigger ambiguity are described herein, additional or alternative solutions may be implemented and/or employed without departing from the scope of the present disclosure. That is, the above described solutions for trigger ambiguity are merely provided for illustrative and explanatory purposes and are not to be limiting.

Advantageously, in accordance with some embodiments, synchronization of multiple modules may be achieved through the use of dual-tone, two-way communication signals. Accordingly, multiple-receiver/module downhole systems may be employed and synchronized. The dual-tone, two-way synchronization described herein enables systems to have smaller, individual modules that may replace a larger single module. Accordingly, modules of the present disclosure may be shorter and/or lighter than traditional larger modules.

Modules, as disclosed herein, may comprise Field Programmable Gate Arrays (FPGA), Application Specific Integrated Circuits (ASIC), or Multi Chip Modules (MCM). MCMs are used in high temperature applications and avoid using organic materials. Electronic components, such as capacitors, resistors, inductors, semi-conductors, or integrated circuits, are not potted or isolated with organic materials. Connecting capacitors, resistors, or inductors may use high temperature solder. Semiconductor components are often not soldered to a metallization of the ceramics substrate but rather are interconnected by wire-bonding or using adhesives. Semiconductor components may be wire-bonded to the substrate as a so called "bare die." Soldering is used with semiconductor components only rarely because soldering may lead to interaction between degassing solder material and semi-conductor material.

The first module and the second module, as disclosed herein, may comprise a processor unit (such as a microprocessor) to perform processing steps of the disclosed method(s) and/or to control operation of the first and/or second modules. The first and second modules may also comprise digital-analog converters (DAC) for converting analog signals into digital signals and vice versa. Further, the first and second modules may comprise amplifiers to amplify signals used in the methods and processes described herein. In accordance with some embodiments of the present disclosure, the dual-tone generator includes at least one or more frequency generators (such as a digital direct synthesizer (DDS)), a processing unit (such as a digital processing unit (DSP)), and a mixing unit. The dual-tone generator may also comprise a look-up table for looking up signal parameters. Further, the disclosed modem may be a modulator and demodulator unit that converts data suitable for a communication channel based on a communication protocol. A modem modulates one or more carrier wave signals to encode digital information for transmission and demodulates signals to decode the transmitted information.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1: A method of correcting an operation of multiple modules, the method comprising: generating a first dual-tone signal using a first signal generator in a first module, the first dual-tone signal having a first frequency $f_1$ and a second frequency $f_2$ that is different from the first frequency $f_1$; transmitting the first dual-tone signal from the first module to a second module; generating a second dual-tone signal using a second signal generator in the second module, the second dual-tone signal having a third frequency $f_3$ and a fourth frequency $f_4$ that is different from the third frequency $f_3$; transmitting the second dual-tone signal from the second module to the first module; determining, at the first module, a first phase of the received second dual-tone signal; determining, at the second module, a second phase of the received first dual-tone signal; and correcting the operation of at least one of the first module and the second module based on the determined first phase and the determined second phase.

Embodiment 2: The method of any preceding embodiment, wherein correcting the operation comprises a phase correction Embodiment 3: The method of any preceding embodiment, further comprising: transmitting a first clock frequency from the first module to the second module; and matching a second clock frequency of the second module with the transmitted first clock frequency.

Embodiment 4: The method of any preceding embodiment, further comprising communicating the measured second phase from the second module to the first module.

Embodiment 5: The method of any preceding embodiment, wherein the first dual-tone signal is generated by mixing the first frequency $f_1$ and the second frequency $f_2$, and the second dual-tone signal is generated by mixing the third frequency $f_3$ and the fourth frequency $f_4$.

Embodiment 6: The method of any preceding embodiment, wherein the first module is located within a first downhole component and the second module is located within a second downhole component.

Embodiment 7: The method of any preceding embodiment, wherein the first downhole component is a transmitter of a resistivity tool and the second downhole component is a receiver of the resistivity tool.

Embodiment 8: The method of any preceding embodiment, further comprising: receiving, at a third module, the first dual-tone signal; determining, at the third module, a third phase of the first dual-tone signal; and correcting operation of at least one of the third module and the first module based on the third phase.

Embodiment 9: The method of any preceding embodiment, further comprising performing a trigger ambiguity operation to correct for ambiguity in the determining of at least one of the first phase and the second phase.

Embodiment 10: The method of any preceding embodiment, wherein the trigger ambiguity operation comprises at least one of (i) generating a trigger dual-tone signal at the first module and (ii) performing amplitude modulation at the first module on the first dual-tone signal.

Embodiment 11: The method of any preceding embodiment, wherein: the first module comprises a first modem, a first frequency generator, and a first processor; and the second module comprises a second modem, a second frequency generator, and a second processor.

Embodiment 12: The method of any preceding embodiment, wherein a communication line operably connects the first module and the second module.

Embodiment 13: A system for correcting an operation of multiple modules, the system comprising: a first module; a second module; and a communication line operably connecting the first module to the second module; wherein: the first module is configured to generate a first dual-tone signal, the first dual-tone signal having a first frequency $f_1$ and a second frequency $f_2$ that is different from the first frequency $f_1$; the first module is configured to transmit the first dual-tone signal to the second module through the communication line; the second module is configured to generate a second dual-tone signal, the second dual-tone signal having a third frequency $f_3$ and a fourth frequency $f_4$ that is different from the third frequency $f_3$; the second module is configured to transmit the second dual-tone signal to the first module through the communication line; the first module is configured to receive the second dual-tone signal and to determine a first phase of the received second dual-tone signal; the second module is configured to receive the first dual-tone signal and to determine a second phase of the received first dual-tone signal; and a processor configured to correct an operation of at least one of the first module and the second module based on the determined first phase and the determined second phase.

Embodiment 14: The system of any preceding embodiment, wherein correcting the operation comprises a phase correction.

Embodiment 15: The system of any preceding embodiment, wherein the first module is configured to transmit a first clock frequency to the second module; and the second module is configured to match a second clock frequency of the second module with the transmitted first clock frequency.

Embodiment 16: The system of any preceding embodiment, wherein the second module is configured to communicate the determined second phase from the second module to the first module.

Embodiment 17: The system of any preceding embodiment, wherein the first module is located within a first downhole component and the second module is located within a second downhole component.

Embodiment 18: The system of any preceding embodiment, wherein the first downhole component is a transmitter of a resistivity tool and the second downhole component is a receiver of the resistivity tool.

Embodiment 19: The system of any preceding embodiment, further comprising a third module, wherein: the third module is configured to receive the first dual-tone signal; the third module is configured to determine, at the third module, a third phase of the first dual-tone signal; and operation of at least one of the first module and the third module is corrected based on the determined third phase.

Embodiment 20: The system of any preceding embodiment, wherein: the first module comprises a first modem, a first frequency generator, and a first processor; and the second module comprises a second modem, a second frequency generator, and a second processor.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

The invention claimed is:

1. A method of correcting an operation of multiple modules in a downhole environment, the method comprising:
generating a first dual-tone signal using a first signal generator in a first module of the multiple modules, the first dual-tone signal having a first frequency $f_1$ and a second frequency $f_2$ that is different from the first frequency $f_1$;
transmitting the first dual-tone signal from the first module to a second module of the multiple modues, wherein a communication line operably connects the first module to the second module;
generating a second dual-tone signal using a second signal generator in the second module; the second dual-tone signal having a third frequency $f_3$ and a fourth frequency $f_4$ that is different from the third frequency $f_3$;
transmitting the second dual-tone signal from the second module to the first module;
determining, at the first module; a first phase of the second dual-tone signal as received at the first module;

determining, at the second module, a second phase of the first dual-tone signal as received at the second module; and correcting a first operation of at least one of the first module and the second module of the multiple modules based on the determined first phase and the determined second phase and provide a trigger synchronization between the first module and the second module, wherein said correcting the first operation comprises a phase correction.

2. The method of claim 1, further comprising:
transmitting a first clock frequency from the first module to the second module; and
matching a second clock frequency of the second module with the transmitted first clock frequency.

3. The method of claim 1, further comprising communicating the second phase as determined at the second module from the second module to the first module.

4. The method of claim 1, wherein the first dual-tone signal is generated by mixing the first frequency $f_1$ and the second frequency $f_2$, and the second dual-tone signal is generated by mixing the third frequency $f_3$ and the fourth frequency $f_4$.

5. The method of claim 1, wherein the first module is located within a first downhole component and the second module is located within a second downhole component.

6. The method of claim 5, wherein the first downhole component is a transmitter of a resistivity tool and the second downhole component is a receiver of the resistivity tool.

7. The method of claim 1, further comprising:
receiving, at a third module, the first dual-tone signal;
determining, at the third module, a third phase of the first dual-tone signal; and
correcting a second operation of at least one of the third module and the first module based on the third phase.

8. The method of claim 1, further comprising performing a trigger ambiguity operation to correct for ambiguity in the determining of at least one of the first phase and the second phase.

9. The method of claim 8, wherein the trigger ambiguity operation comprises at least one of (i) generating a trigger dual-tone signal at the first module and (ii) performing amplitude modulation at the first module on the first dual-tone signal.

10. The method of claim 1, wherein:
the first module comprises a first modem, a first frequency generator, and a first processor; and
the second module comprises a second modem, a second frequency generator, and a second processor.

11. A system for correcting an operation of multiple modules in a downhole environment, the system comprising:
a first module of the multiple modules;
a second module of the multiple modules; and
a communication line operably connecting the first module to the second module;
wherein;
the first module is configured to generate a first dual-tone signal, the first dual-tone signal having a first frequency f1 and a second frequency f2 that is different from the first frequency f1;
the first module is configured to transmit the first dual-tone signal to the second module through the communication line;
the second module is configured to generate a second dual-tone signal, the second dual-tone signal having a third frequency f3 and a fourth frequency f4 that is different from the third frequency f3;
the second module is configured to transmit the second dual-tone signal to the first module through the communication line;
the first module is configured to receive the second dual-tone signal and to determine a first phase of the received second dual-tone signal;
the second module is configured to receive the first dual-tone signal and to determine a second phase of the received first dual-tone signal;
and a processor configured to correct a first operation of at least one of the first module and the second module of the multiple modules based on the determined first phase and the determined second phase and to provide a trigger synchronization between the first module and the second module, wherein the processor employs a phase correction to correct the first operation of at least one of the first module and the second module.

12. The system of claim 11, wherein
the first module is configured to transmit a first clock frequency to the second module; and
the second module is configured to match a second clock frequency of the second module with the transmitted first clock frequency.

13. The system of claim 11, wherein the second module is configured to communicate the determined second phase from the second module to the first module.

14. The system of claim 11, wherein the first module is located within a first downhole component and the second module is located within a second downhole component.

15. The system of claim 14, wherein the first downhole component is a transmitter of a resistivity tool and the second downhole component is a receiver of the resistivity tool.

16. The system of claim 11, further comprising a third module, wherein:
the third module is configured to receive the first dual-tone signal;
the third module is configured to determine, at the third module, a third phase of the first dual-tone signal; and
a second operation of at least one of the first module and the third module is corrected based on the determined third phase.

17. The system of claim 11, wherein:
the first module comprises a first modem, a first frequency generator, and a first processor; and
the second module comprises a second modem, a second frequency generator, and a second processor.

* * * * *